United States Patent
Ogawa et al.

(10) Patent No.: US 6,351,614 B1
(45) Date of Patent: *Feb. 26, 2002

(54) CAMERA CAPABLE OF DESIGNATING NUMBER OF PRINTS

(75) Inventors: Yukio Ogawa, Yokohama; Takanobu Tsunemiya, Chigasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,190

(22) Filed: Aug. 20, 1998

(30) Foreign Application Priority Data

Aug. 25, 1997 (JP) .............................................. 9-241688
Nov. 19, 1997 (JP) .............................................. 9-333707

(51) Int. Cl.$^7$ .............................................. G03B 17/24
(52) U.S. Cl. ........................................ 396/317; 396/319
(58) Field of Search ................................ 396/287–292, 396/310, 311, 319; 355/40

(56) References Cited

U.S. PATENT DOCUMENTS

| 5,574,520 A | * | 11/1996 | Ishihara | .................. 396/311 X |
| 5,778,265 A | * | 7/1998 | Seki | ........................... 396/311 |
| 5,983,035 A | * | 11/1999 | Funaki | ....................... 396/310 |
| 6,055,381 A | * | 4/2000 | Maruyama | .................. 396/319 |

* cited by examiner

*Primary Examiner*—Alan A. Mathews
(74) *Attorney, Agent, or Firm*—Robin, Blecker & Daley

(57) ABSTRACT

A camera includes a number-of-prints designating device which selectively designates number of prints for each frame of an image recording medium, and a display device which makes it possible to know whether a frame of the image recording medium for which number of prints is to be selectively designated by the number-of-prints designating device is an exposed frame or an unexposed frame.

26 Claims, 17 Drawing Sheets

CAMERA CAPABLE OF DESIGNATING NUMBER OF PRINTS

BACKGROUND OF THE INVENTION

1. Field of the Invention

The present invention relates to a camera capable of designating the number of prints, i.e, capable of, at the time of photo-taking, designating the number of prints of a taken photograph, for the purpose of instructing a printing apparatus or photofinishing apparatus to produce the designated number of prints of the photograph.

2. Description of Related Art

Heretofore, there have been proposed cameras capable of permitting the user to beforehand designate the number of prints of a taken photograph at the time of photo-taking. For example, in a camera disclosed in Japanese Laid-Open Patent Application No. HEI 8-110566, when the number of prints of a photograph has been designated, information on the designated number of prints is recorded on a film by a magnetic head at the time of winding of the film after completion of photo-taking on each frame of the film. In addition, in a case where it is desired to correct the number of prints already designated for any frame of the film after completion of photo-taking on the frame, when the number of prints has been redesignated, the film is rewound to an extent of one frame and, after that, information on the redesignated number of prints is recorded on the film by the magnetic head while this frame portion of film is wound up again.

Further, some types of cameras capable of designating the number of prints beforehand have already been commercialized. For example, there is a type of camera arranged to, when the number of prints is designated before photo-taking by the user, display the designated number of prints on an external display member of the camera. In addition, there is another type of camera capable of changing the number of prints even after photo-taking, in which the number of prints to be changed is also displayed on an external display member of the camera.

In the above-mentioned camera capable of designating the number of prints, when the user designates the number of prints, he or she makes reference to the indication of the number of prints displayed on the external display member (for example, a liquid crystal display) of the camera. However, there is no clear indication as to discrimination between the number of prints displayed on the external display member when designating the number of prints before photo-taking and the number of prints displayed on the external display member when redesignating the number of prints for correction after photo-taking. So, there are a number of obscure points. Further, in the above-mentioned camera, since one and the same display manner is employed in both the indication of the number of prints designated before photo-taking and the indication of the number of prints designated after photo-taking, there are such shortcomings that, even when the user looks at the indication of the number of prints displayed on the external display member, he or she tends to be unable to discriminate the indication between a display made for designating the number of prints for a frame before exposure and a display made for redesignating the number of prints for a frame after exposure.

BRIEF SUMMARY OF THE INVENTION

In accordance with one aspect of the invention, there is provided a camera comprising a number-of-prints designating device which selectively designates number of prints for each frame of an image recording medium, and a display device which makes it possible to know whether a frame of the image recording medium for which number of prints is to be selectively designated by the number-of-prints designating device is an exposed frame or an unexposed frame, so that the camera is of excellent operability to enable the user to readily find whether the frame for which the number of prints is to be designated is an unexposed frame or an exposed frame.

The above and other aspects of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
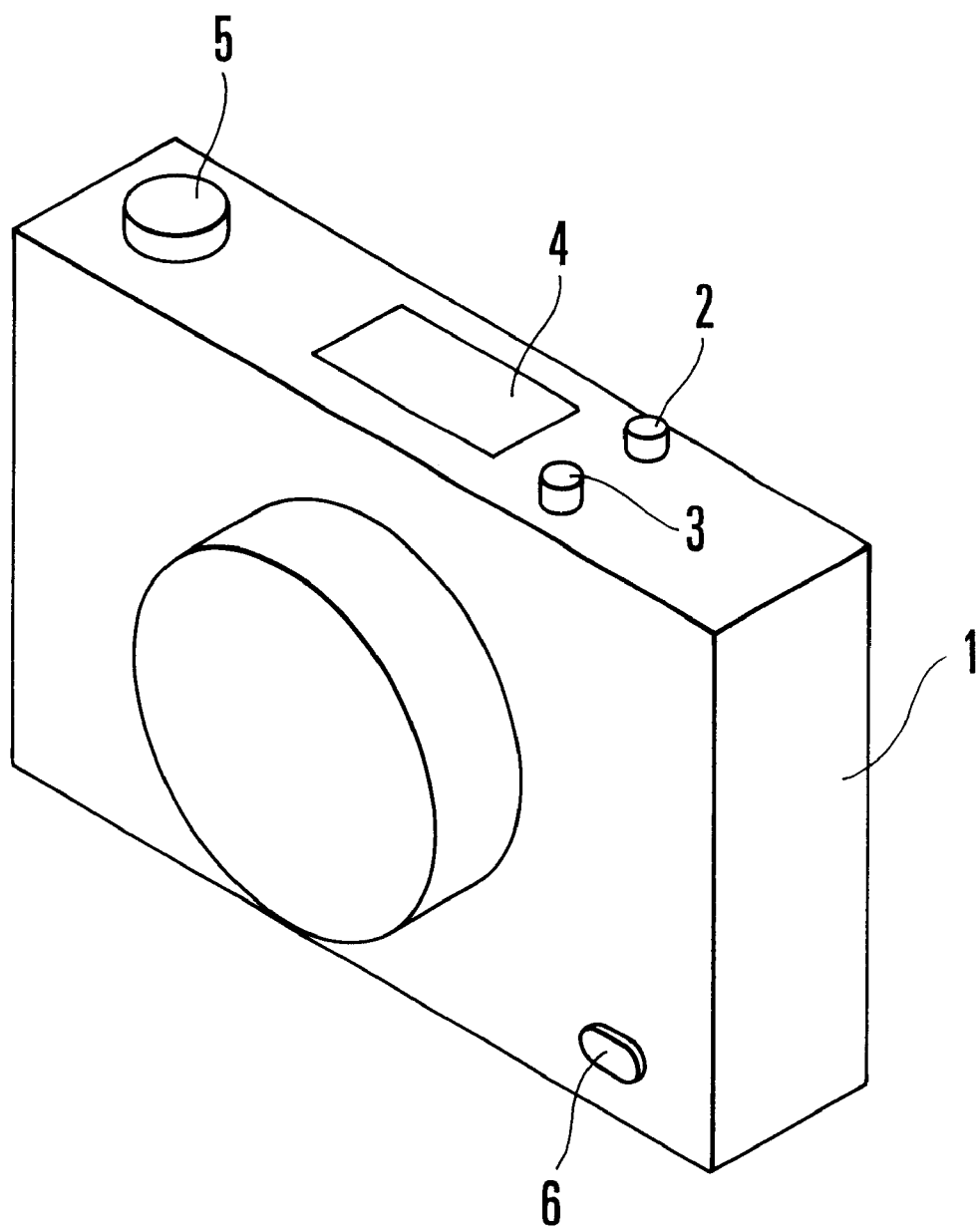
FIG. 1 is a perspective view showing the appearance of a camera capable of designating the number of prints, according to a first embodiment of the invention.

FIG. 1 shows in a perspective view the appearance of a camera capable of designating the number of prints, according to a first embodiment of the invention. On the upper side of a camera body 1, there are provided a number-of-prints designating button 2, a number-of-prints change instructing button 3, an external display device 4, such as a liquid crystal display device or the like, arranged to display the number of prints, and a release button 5. A main switch 6 is disposed on the front side of the camera body 1.

Figure 2:
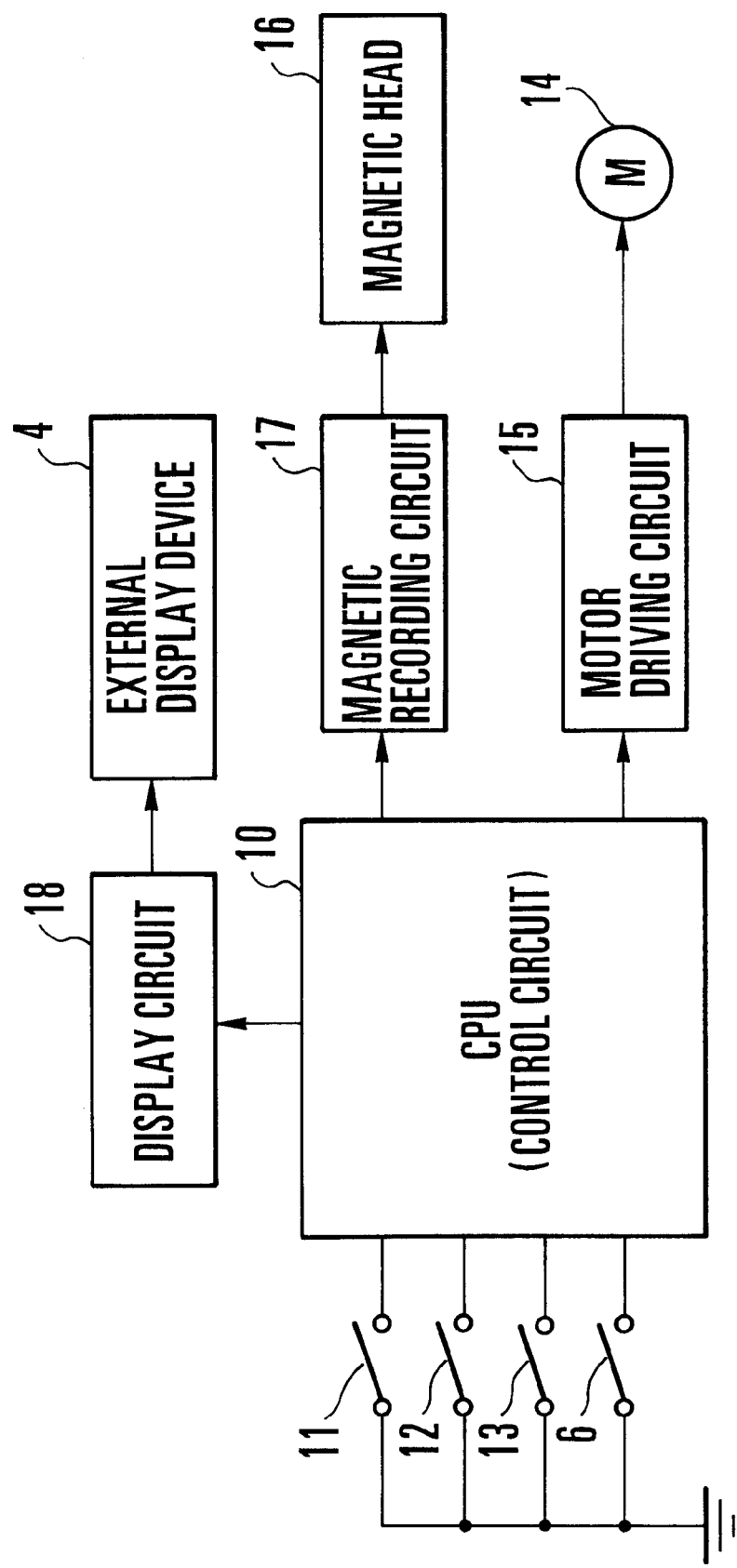
FIG. 2 is a block diagram showing the electrical arrangement of the camera capable of designating the number of prints, according to the first embodiment of the invention.

FIG. 2 is a block diagram showing in outline the electrical arrangement of the camera shown in FIG. 1, according to the first embodiment of the invention. As shown in FIG. 2, the camera is provided with a CPU (a control circuit) 10 for control over the whole camera. To the CPU 10 are connected a release switch 11 which turns on or off in response to an operation on the release button 5, a number-of-prints designating switch 12 which turns on or off in response to an operation on the number-of-prints designating button 2, a number-of-prints change instructing switch 13 which turns on or off in response to an operation on the number-of-prints change instructing button 3, and the main switch 6. To the CPU 10 are also connected a motor driving circuit 15 which controls a film transport motor 14, a magnetic recording circuit 17 which controls a magnetic head 16 provided for recording information of various kinds in a magnetic recording part (a magnetic track part) of a film, and a display circuit 18 which drives the external display device 4.

An operation of the camera having the above construction is described below with reference to the flow charts of FIGS. 3 and 4 which show a flow of operation of the CPU 10.

Figure 3:
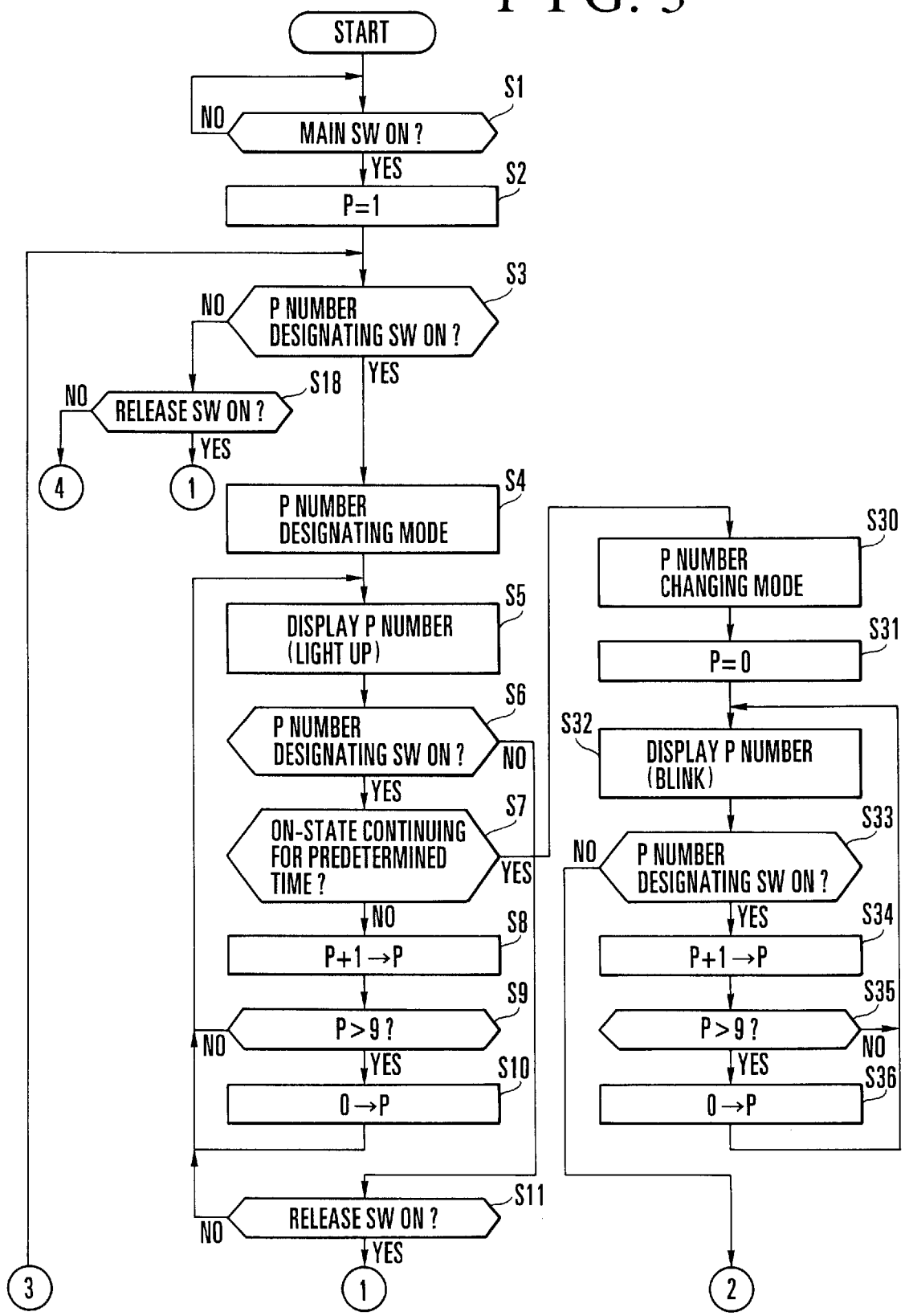
FIG. 3 is a flow chart showing in part an operation of the camera capable of designating the number of prints, according to the first embodiment of the invention.

At a step S1 of FIG. 3, the CPU 10 makes a check for the state of the main switch 6. When the turning-on of the main switch 6 is detected, the flow of operation proceeds to a step S2. At the step S2, the CPU 10 sets "P=1" at a register provided for counting the number-of-prints. At the next step S3, a check is made to find if the number-of-prints (abbreviated to "P number" in the flow charts) designating switch 12 is in the on-state. If not, the flow proceeds to a step S18. At the step S18, a check is made to find if the release switch 11 is in the on-state. If so, the flow proceeds from the step S18 to a step S12 of FIG. 4. If not (if the release switch 11 is off), the flow proceeds to a step S18 of FIG. 4.

If the number-of-prints designating switch 12 is found at the step S3 to be in the on-state, the flow proceeds from the step S3 to a step S4. At the step S4, the CPU 10 sets the camera into a number-of-prints designating mode. At the next step S5, the external display device 4 is caused through the display circuit 18 to display a figure corresponding to the number of prints. In this instance, a display "P1" is lighted up.

At the next step S6, a check is made to find if the number-of-prints designating switch 12 remains in the on-state. If so, the flow proceeds to a step S7. At the step S7, a check is made to find if the on-state of the number-of-prints designating switch 12 has continued for a predetermined period of time or longer than that time. If not, i.e., in a case where the switch 12 is turned off within the predetermined period of time, the flow proceeds from the step S7 to a step S8. At the step S8, the value P (denoting the number of prints) of the number-of-prints counting register is incremented by one. At the next step S9, a check is made to find if the value P of the number-of-prints counting register has become larger than "9". Since the value P is "2" at this time, the flow returns to the step S5 to have a figure corresponding to the number of prints displayed at the external display device 4. In this instance, a display "P2" is lighted up on the display device 4.

After that, the processes described above are repeated. Then, a figure corresponding to the value P of the number-of-prints counting register is displayed on the external display device 4 every time the number-of-prints designating switch 12 turns on. When the value P is found at the step S9 to have exceeded "9", the flow proceeds to a step S10. At the step S10, the value P of the number-of-prints counting register is brought back to the initial value "0", and the flow returns to the step S5.

When the number-of-prints designating process is considered to have finished with the number-of-prints designating switch 12 found at the step S6 to be in the off-state, the flow proceeds to a step S11. At the step S11, a check is made to find if the release switch 11 is in the on-state. If so, the flow proceeds to the step S12 of FIG. 4.

Figure 4:
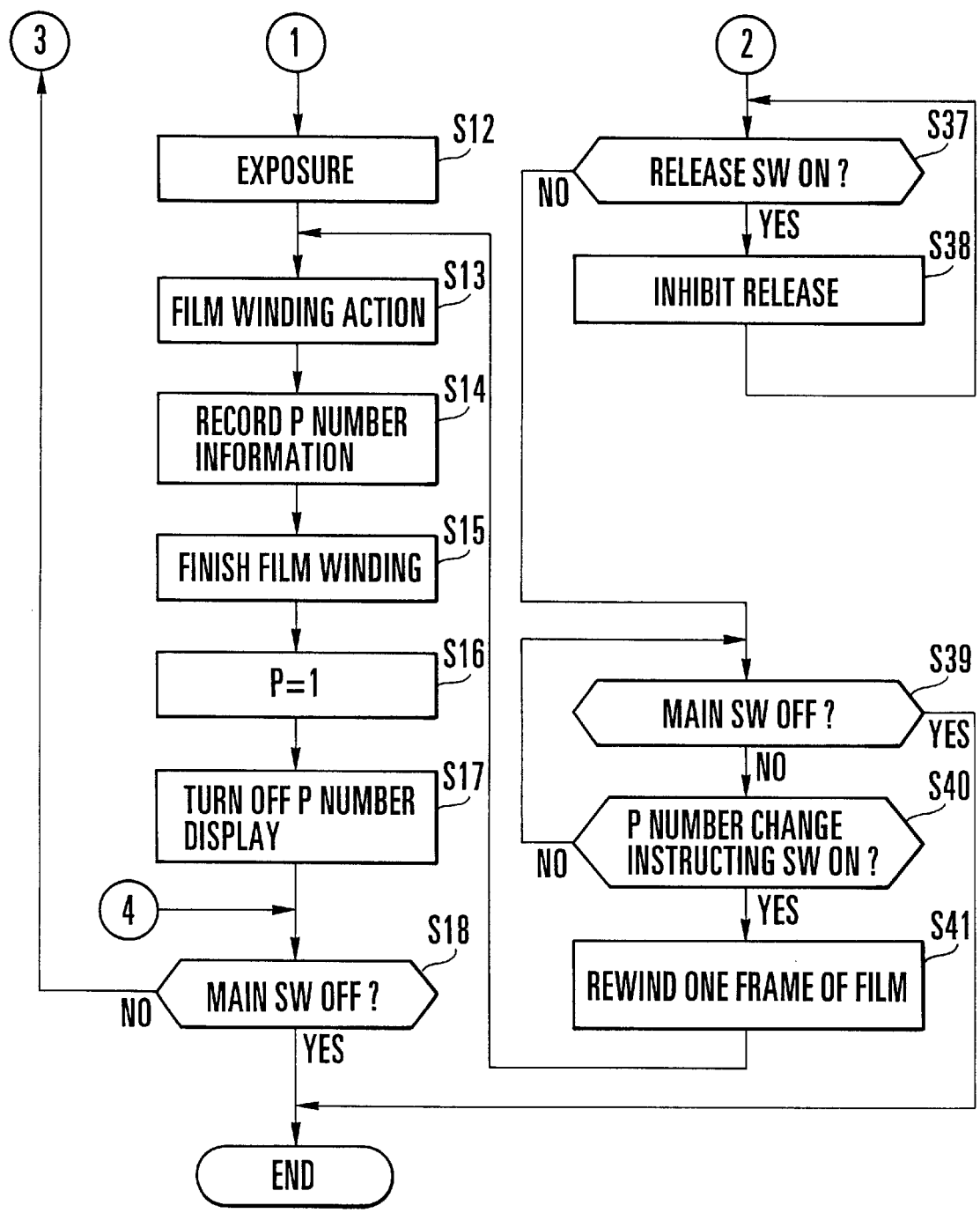
FIG. 4 is a flow chart showing a part continuing from the flow of operation shown in FIG. 3.

At the step S12 of FIG. 4, an exposure is carried out in a known manner. At the next step S13, the motor driving circuit 15 is caused to drive the motor 14 to perform a one-frame winding action on a photo-taking frame of the film. At a step S14, while the one-frame film winding is in process, the magnetic recording circuit 17 is caused to drive the magnetic head 16 to record information on the designated number of prints in the magnetic track part of the film. At a step S15, the motor 14 is brought to a stop through the motor driving circuit 15 and the one-frame film winding action comes to an end. At a step S16, the value P of the number-of-prints counting register is reset to "1". At a step S17, the number-of-prints display at the external display device 4 is turned off. At the step S18, a check is made to find if the main switch 6 still remains in the on-state. If so, the flow returns to the step S3 of FIG. 3. If not, i.e., if the main switch 6 is found to be in the off-state, the flow of operation comes to an end.

In a case where, in order to change the number of prints for a frame which has already been exposed for phototaking, the number-of-prints designating switch 12 is found at the step S7 to remain in the on-state for a period of time longer than the predetermined period of time, the flow of operation proceeds from the step S7 to a step S30. At the step S30, the camera is set into a number-of-prints changing mode. At the next step S31, the value P of the number-of-prints counting register is reset to "0". At a step S32, the mode of display of the external display device 4 is changed from a lighting-up display mode to a blinking display mode. As a result, the external display device 4 displays a figure corresponding to "P=0" in a blinking manner.

At a step S33, a check is made to find if the number-of-prints designating switch 12 is turned on. If so, the flow proceeds to a step S34. At the step S34, the P value of the number-of-prints counting register is incremented by one. At a step S35, a check is made to find if the P value of the number-of-prints counting register has exceeded "9". If not, the flow returns to the step S32 to repeat the above-stated steps. If the P value of the number-of-prints counting register is found at the step S35 to have exceeded "9" with the number-of-prints designating switch 12 repeatedly turned on, the flow proceeds to a step S36. At the step S36, the P value of the number-of-prints counting register is reset to "0", and the flow returns to the step S32.

If the number-of-prints designating switch 12 is found at the step S33 to be turned off with the number-off-prints correcting (redesignating) action considered to have finished, the flow proceeds to a step S37 of FIG. 4. At the step S37, a check is made to find if the release switch 11 is in the on-state. If so, the flow proceeds to a step S38 to inhibit a shutter release from being made for an exposure action after turning on the release switch 11, and the flow then returns to the step S37. When the release switch 11 is found at the step S37 to be in the off-state, the flow proceeds to a step S39. At the step S39, a check is made to find if the main switch 6 is in the off-state. If so, the flow of operation comes to an end.

Further, if the main switch 6 is found at the step S39 to be in the on-state, the flow proceeds to a step S40. At the step S40, a check is made to find if the number-of-prints change instructing switch 13 is turned on. If so, the flow proceeds to a step S41. At the step S41, the motor driving circuit 15 is caused to drive the motor 14 to perform a one-frame rewinding action on a photo-taking frame of the film. After the step S41, the flow proceeds to the step S13 described in the foregoing. At the step S13, the motor 14 is caused to reversely rotate to perform the one-frame winding action on the film. At the next step S14, information on the designated number of prints is recorded by the magnetic head 16 in the magnetic track part of the film in the same manner as mentioned in the foregoing. At the step S15, the one-frame winding action is finished. At the step S16, the P value of the number-of-prints counting register is reset to "1". At the step S17, the number-of-prints display at the external display device 4 is turned off. The flow then proceeds from the step S17 to the step S18. If the main switch 6 is found at the step S18 to be still in the on-state, the flow returns to the step S3 to shift the flow of operation to processes of designating the number of prints for the next photo-taking frame. If the main switch 6 is found at the step S18 to be in the off-state, the above-stated flow of operation comes to an end.

In the first embodiment described above, the display of the number of prints designated for an unexposed frame is made in the lighting-up display mode (at the step S5 of FIG. 3). On the other hand, the display of the number of prints designated for an exposed frame is made in the blinking display mode (at the step S32 of FIG. 3). In other words, the display mode for an exposed frame is arranged to differ from the display mode for an unexposed frame. This arrangement effectively eliminates the shortcomings of the conventional display arrangement whereby a display of the redesignated number of prints for an exposed frame hardly can be discriminated from a display of the designated number of prints for an unexposed frame. The above-stated use of one display mode for an exposed frame and another display mode for an unexposed frame is of course reversible.

Further, in the event of an inadvertent release operation while the number-of-prints changing designation is in process, the release action is inhibited, at the steps S37 and S38 of FIG. 4, during the time when the number-of-prints changing designation is on the blinking display, i.e., until information on the redesignated number of prints is recorded. Therefore, even in that event, the camera effectively prevents any photograph from being wastefully taken. Further, while the prior art arrangement has presented such a problem that the number of prints intended to be redesignated for a frame in an attempt to correct the number designated to the frame is designated (recorded) for the next exposed frame by mistake and thus necessitates a troublesome correcting operation, the first embodiment of the invention effectively solves the problem.

The first embodiment is arranged to automatically shift the number-of-prints designating mode to the number-of-prints designation changing mode, at the steps S7 and S30 of FIG. 3, when the number-of-prints designating button 2 is kept in the on-state for a predetermined period of time. The provision of these steps obviates the necessity of providing an additional operation button for selecting the designation changing mode, and, therefore, permits effective utilization of a space available within the camera.

Further, the display for changing the designated number of prints, i.e., a number-of-prints redesignating display, is arranged to be made by showing figures in rotation from "0" (the step S31 of FIG. 3). According to the prior art arrangement, the rotative display begins from "1". Therefore, in a case where it is desired to designate "0", which is often desired because the desire to change and redesignate the number of prints often results from a photo-taking failure, the designation must be made by repeating the process of correction in such a sequence as 1→2→3→4→5→6→7→8→9→0. The prior art arrangement thus necessitates many correcting steps before designating "0". This shortcoming can be also eliminated by the arrangement of the first embodiment described above.

Figure 5:
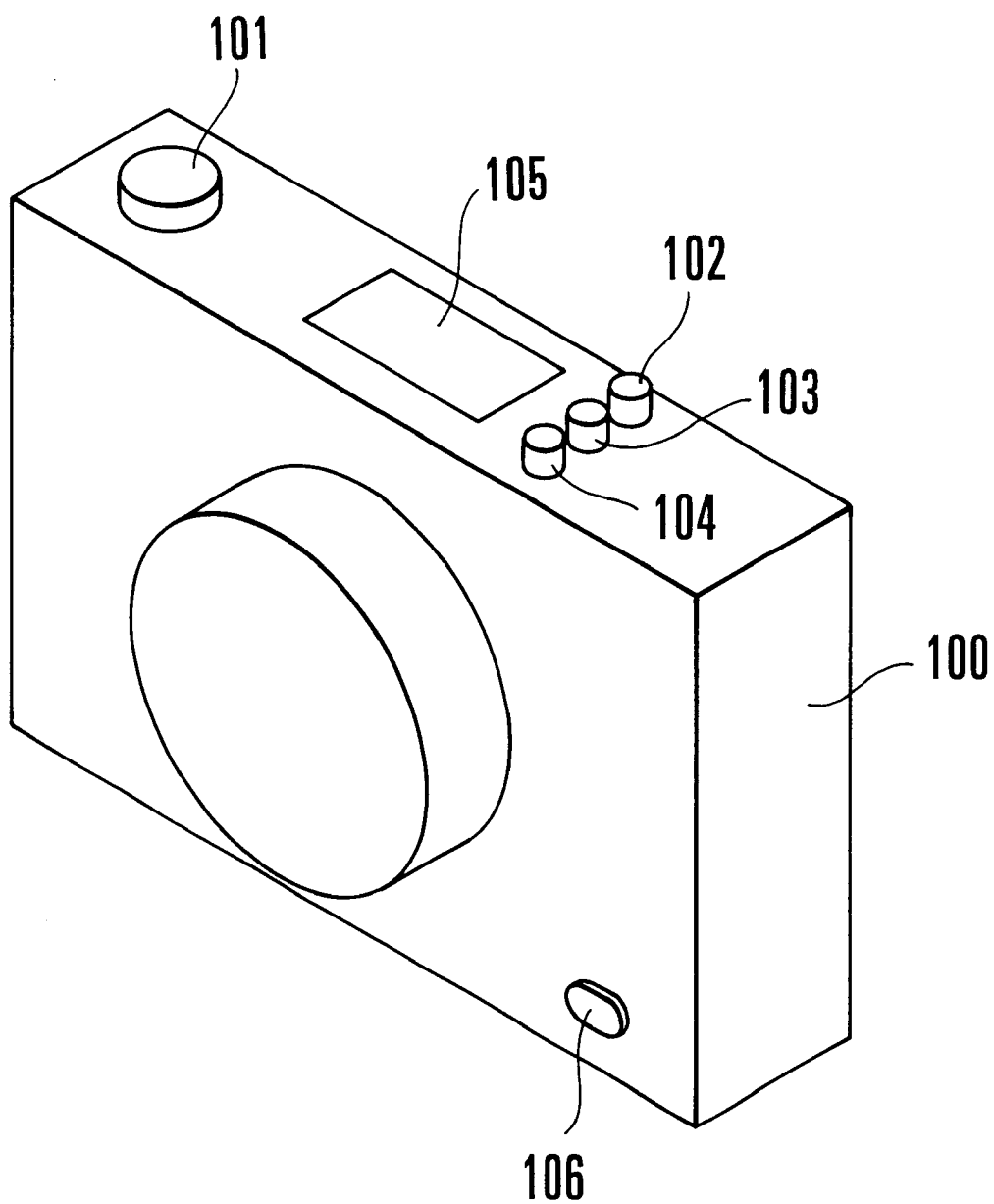
FIG. 5 is a perspective view showing the appearance of a camera capable of designating the number of prints, according to a second embodiment of the invention.

FIG. 5 shows in a perspective view the appearance of a camera capable of designating the number of prints, according to a second embodiment of the invention. As shown in FIG. 5, a number-of-prints designating button 102, a mode selection button 103, a number-of-prints change instructing button 104, an external display device 105 which is a liquid crystal display device arranged to display the number of prints, and a release button 101 are disposed on the upper side of a camera body 100. Reference numeral 106 denotes a main switch of the camera.

Figure 6:
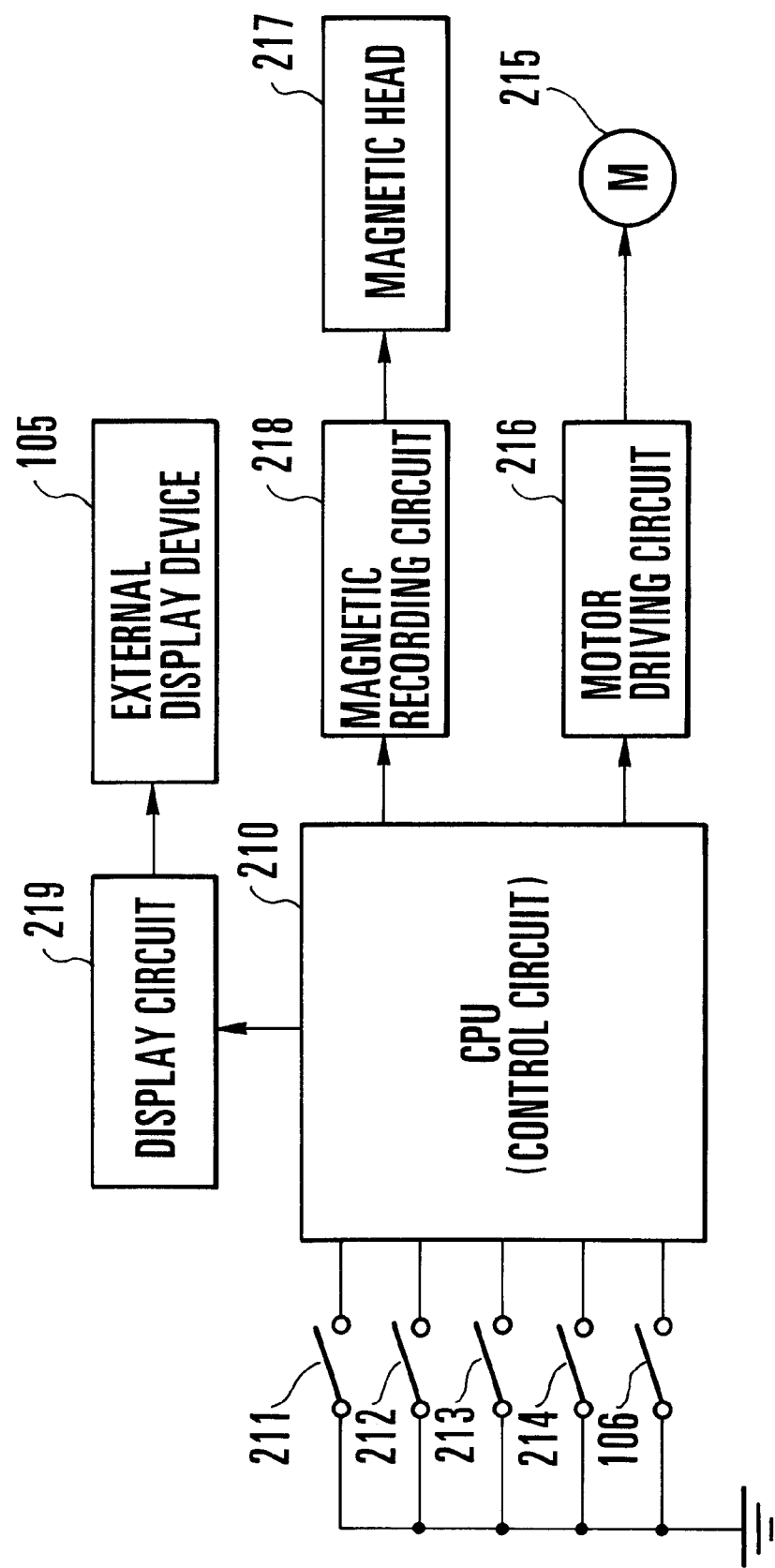
FIG. 6 is a block diagram showing the electrical arrangement of the camera capable of designating the number of prints, according to the second embodiment of the invention.

FIG. 6 is a block diagram showing in outline the electrical arrangement of the camera shown in FIG. 5. As shown in FIG. 6, the camera is provided with a CPU (control circuit) 210 for control over the whole camera. To the CPU 210 are connected a release switch 211 arranged to turn on or off in response to an operation on the release button 101, a number-of-prints designating switch 212 arranged to turn on or off in response to an operation on the number-of-prints designating button 102, a mode selection switch 213 arranged to turn on or off in response to an operation on the mode selection button 103, a number-of-prints change instructing switch 214 arranged to turn on or off in response to an operation on the number-of-prints change instructing button 104, and the main switch 106. Further, a motor driving circuit 216 arranged to control a film transport motor 215, a magnetic recording circuit 218 arranged to control and drive a magnetic head 217 to record information of varied kinds in a magnetic track part of a film, and a display circuit 219 arranged to drive the external display device 105 are also connected to the CPU 210.

An operation of the camera having the above construction is next described below with reference to FIGS. 7 and 8 which are flow charts showing a flow of operation of the CPU 210.

Figure 7:
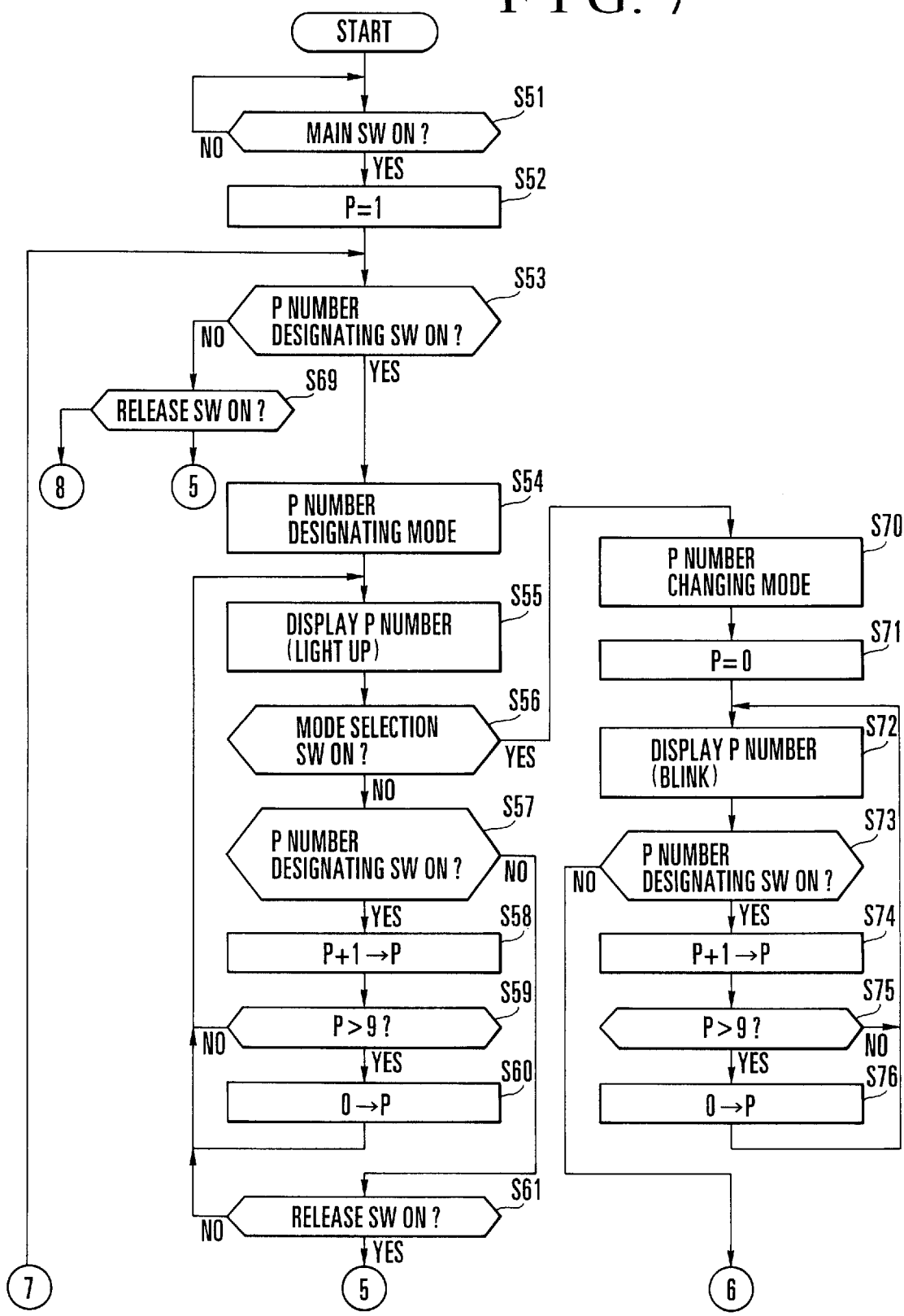
FIG. 7 is a flow chart showing in part an operation of the camera capable of designating the number of prints, according to the second embodiment of the invention.

Referring to FIG. 7, when the main switch 106 is found at a step S51 to be in the on-state, the flow proceeds to a step S52. At the step S52, a register for counting the number of prints (P number) is set to "1" (P=1). At the next step S53, a check is made for the state of the number-of-prints designating switch 212. If the number-of-prints designating switch 212 is found to be in the off-state, the flow of operation proceeds to a step S69. At the step S69, a check is made to find if the release switch 211 is in the on-state. If so, the flow proceeds to a step S62 of FIG. 8. If not, the flow proceeds to a step S68 of FIG. 8. Meanwhile, if the number-of-prints (P number) designating switch 212 is found at the step S53 to be in the on-state, the flow proceeds from the step S53 to a step S54. At the step S54, the camera is set into a mode of designating the number of prints (abbreviated to "P number" in the flow charts). At the next step S55, the display circuit 219 is caused to display a figure corresponding to the number of prints at the external display device 105. In this instance, a display "P1" is lighted up.

At a step S56, a check is made to find if the mode selection switch 213 is in the on-state. If so, the flow proceeds to a step S70 for processes which will be described in detail later. If not, the flow proceeds to a step S57. At the step S57, a check is made to find if the number-of-prints designating switch 212 still remains in the on-state. If so, the flow proceeds to a step S58 to add "1" to the P value of the number-of-prints counting register. At the next step S59, a check is made to find if the P value of the number-of-prints counting register has become larger than "9". The P value is at "2" (P=2) in this instance. The flow then returns to the step S55 to display the figure corresponding to the number of prints at the external display device 105. At the external display device 105, a display "P2" is lighted up in this instance.

With these steps repeated, figures corresponding to the P values of the number-of-prints counting register are displayed one after another in rotation at the external display device 105 every time the number-of-prints designating switch 212 is turned on. When the P value of the number-of-prints counting register comes to exceed "9", the flow proceeds to a step S60. At the step S60, the P value of the number-of-prints counting register is brought back to "0", and the flow returns to the step S55.

When the number-of-prints designating switch 212 is found at the step S57 to be turned off, with a number-of-prints designating operation considered to be finished, the flow proceeds to a step S61. At the step S61, the state of the release switch 211 is checked. If the release switch 211 is found to be in the off-state, the flow returns to the step S55. If the release switch 211 is found to be in the on-state, the flow proceeds to the step S62 of FIG. 8.

Figure 8:
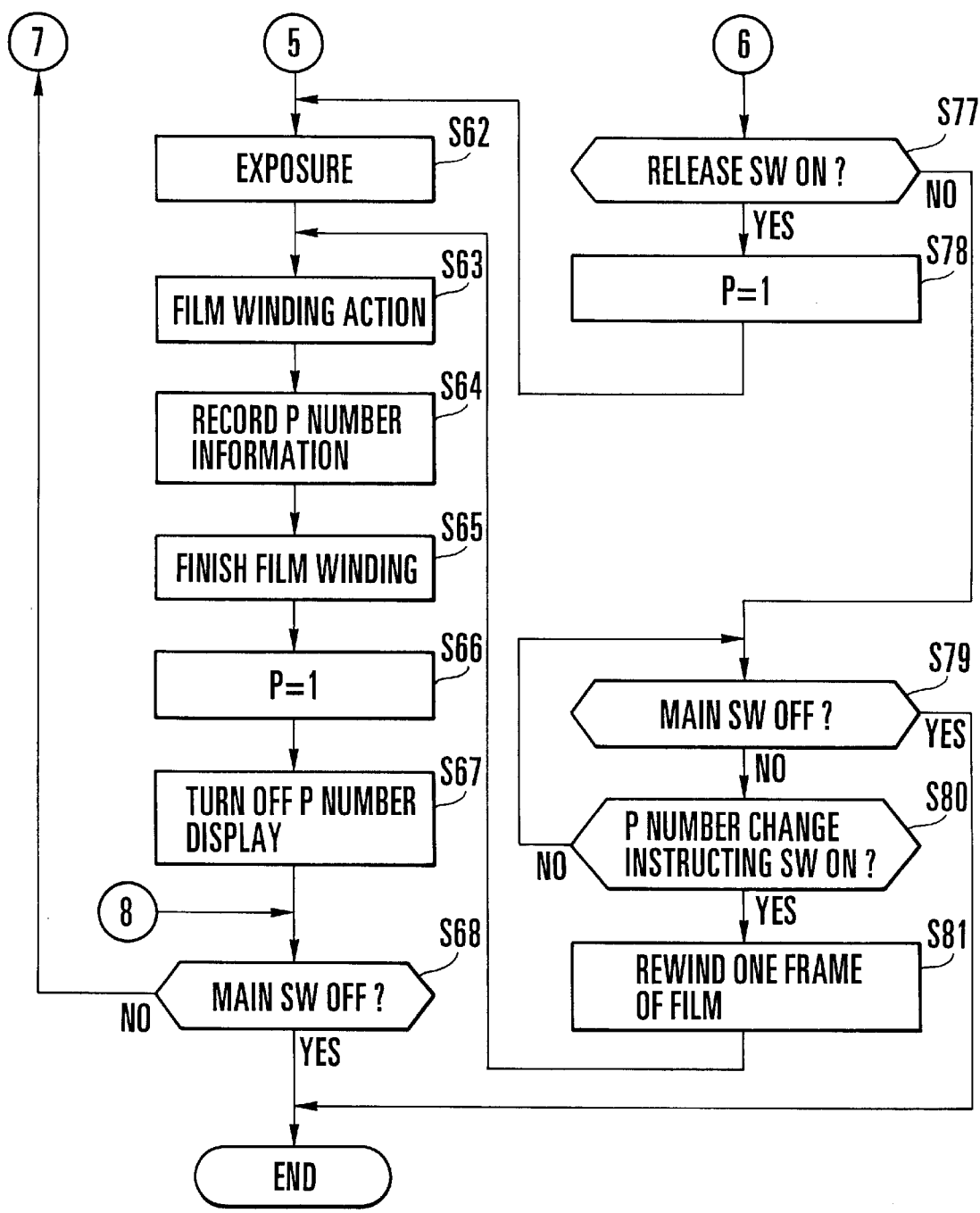
FIG. 8 is a flow chart showing a part continuing from the flow of operation shown in FIG. 7.

At the step S62 of FIG. 8, an exposure action is carried out in a known manner. At the next step S63, the motor driving circuit 216 is caused to drive the motor 215. The motor 215 then begins to perform a one-frame winding action on an exposed frame of the film. At a step S64, the magnetic recording circuit 218 is caused to drive the magnetic head 217 to record information on the designated number of prints in the magnetic track part of the film while the one-frame film winding action is in process. At the next step S65, the motor driving circuit 216 is caused to bring the rotation of the motor 215 to a stop. The one-frame film winding action then comes to an end. At a step S66, the P value of the number-of-prints counting register is reset to "1". At a step S67, the number-of-prints display of the external display device 105 is turned off. At a step S68, a check is made for the state of the main switch 106. If the main switch 106 is found to be still in the on-state, the flow returns to the step S53 to perform the processes of designating the number of prints for the next photo-taking frame of the film. If the main switch 106 is found to be in the off-state, the flow of operation comes to an end.

Meanwhile, if the mode selection switch 213 is found at the step S56 of FIG. 7 to be in the on-state, the flow proceeds from the step S56 to the step S70 as mentioned above. At the step S70, the camera is set into a number-of-prints (P number) changing mode. At the next step S71, the P value of the number-of-prints counting register is reset to "0". At a step S72, the display mode of the external display device 205 is changed from a lighting-up display mode to a blinking display mode. As a result, a figure corresponding to "P=0" is displayed at the external display device 105 in a blinking manner.

At the next step S73, a check is made to find if the number-of-prints designating switch 212 is turned on. If so, the flow proceeds to a step S74. At the step S74, "1" is added to the P value of the number-of-prints counting register, that is, the P value is incremented by one. At a step S75, a check is made to find if the P value of the number-of-prints counting register has exceeded "9". If not, the flow returns to the step S72 to repeat the above-stated processes. With these processes repeated, when the P value of the number-of-prints counting register is found at the step S75 to have exceeded "9", the flow proceeds from the step S75 to a step S76. At the step S76, the P value of the number-of-prints counting register is reset to "0", and the flow returns to the step S72.

When the number-of-prints designating switch 212 is found at the step S73 to be turned off, with the process of changing or redesignating the number of prints considered to have been completed, the flow proceeds to a step S77 of FIG. 8. At the step S77, a check is made to find if the release switch 211 is turned on. If so, the flow proceeds to a step S78. At the step S78, the P value of the number-of-prints counting register is set to "1", and the above-stated step S62 and the steps subsequent thereto are executed.

If the release switch 211 is found to be in the off-state, the flow proceeds from the step S77 to a step S79. At the step S79, a check is made to find if the main switch 106 is in the off-state. If so, the flow of operation comes to an end. If the main switch 106 is found at the step S79 to be in the on-state, the flow proceeds to a step S80. At the step S80, a check is made to find if the number-of-prints change instructing switch 213 has been turned on. If so, the flow proceeds to a step S81. At the step S81, the motor driving circuit 216 is caused to drive the motor 215 to perform a one-frame rewinding action on a photo-taking frame of the film. After the step S81, the flow proceeds to the step S63 described in the foregoing. At the step S63, the motor 215 is caused to reversely rotate to perform the one-frame winding action on the film. At the next step S64, information on the designated number of prints is recorded by the magnetic head 217 in the magnetic track part of the film in the same manner as mentioned in the foregoing. At the step S65, the one-frame film winding action is finished. At the step S66, the P value of the number-of-prints counting register is reset to "1". At the step S67, the number-of-prints display at the external display device 105 is turned off. The flow then proceeds from the step S67 to the step S68. If the main switch 106 is found at the step S68 to be still in the on-state, the flow returns to the step 553 to shift the flow of operation to processes of designating the number of prints for the next photo-taking frame. If the main switch 106 is found at the step S68 to be in the off-state, the above-stated flow of operation comes to an end.

In the second embodiment described above, the display of the number of prints designated for an unexposed frame is made in the lighting-up display mode (at the step S55 of FIG. 7). On the other hand, the display of the number of prints designated for an exposed frame is made in the blinking display mode (at the step S72 of FIG. 7). In other words, the display mode for an exposed frame is arranged to differ from the display mode for an unexposed frame. This arrangement eliminates the shortcoming of the conventional display arrangement whereby a display of the redesignated number of prints for an exposed frame can be hardly discriminated from a display of the designated number of prints for an unexposed frame.

In the event of an inadvertent release operation while the number-of-prints designation changing action is in process, the release action is allowed to be carried out. However, since the number of prints is forcibly designated to "1", in that event, at the steps S77 and S78 of FIG. 8, the number of prints can be prevented from being designated to a large number wastefully.

Further, the display for changing the designated number of prints, i.e., a number-of-prints redesignating display, is arranged to be made by showing figures in rotation from "0" (the step S71 of FIG. 7), unlike the prior art arrangement whereby the rotative display begins from "1". According to the prior art arrangement, in a case where it is desired to designate "0" which is often desired because the desire for changing the number of prints often results from a phototaking failure, redesignation must be made by repeating the process of correction in such a way as 1→2→3→4→5→6→7→8→9→0. This shortcoming can be also eliminated by the arrangement of the second embodiment described above.

Figure 9:
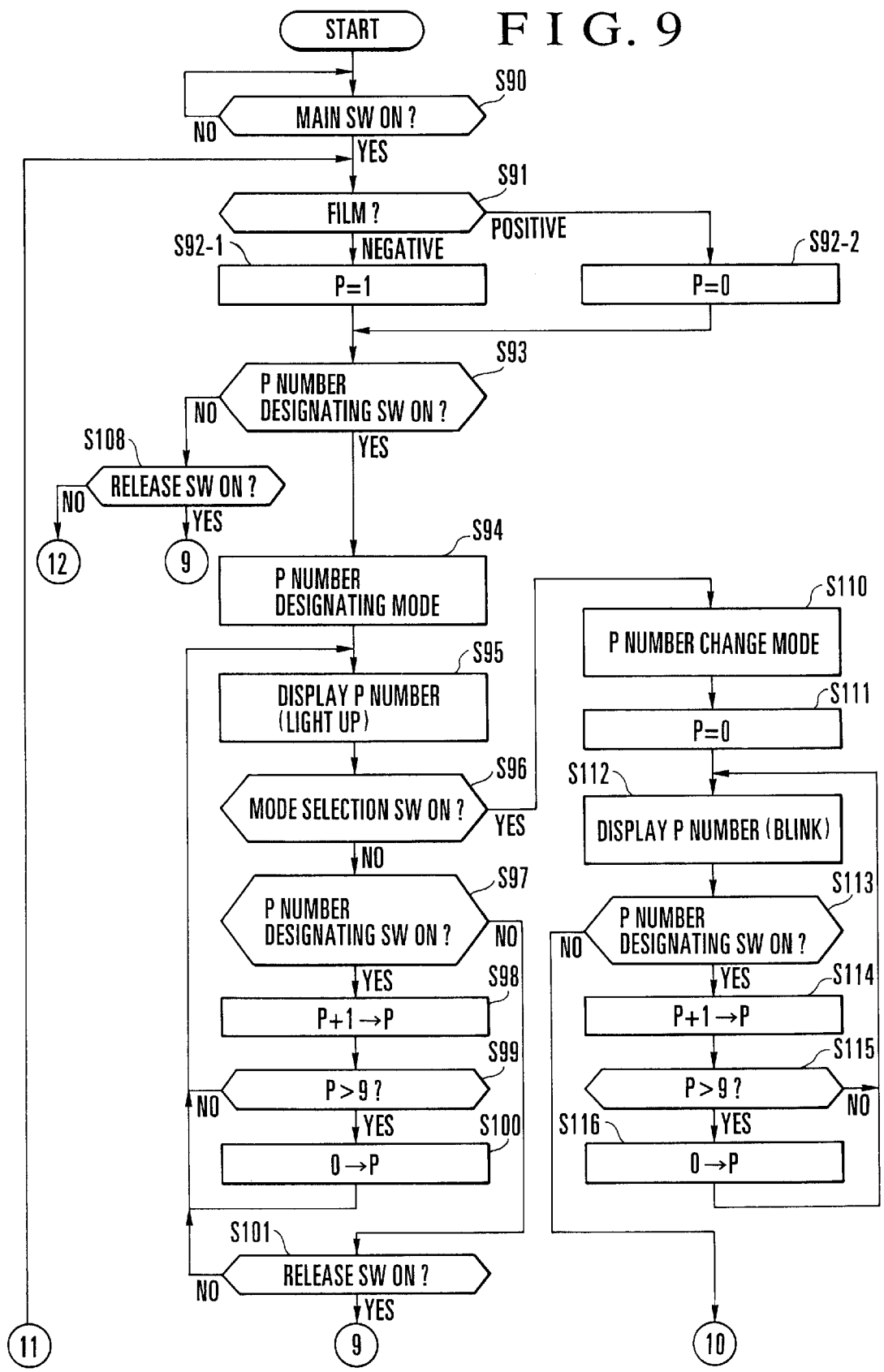
FIG. 9 is a flow chart showing in part an operation of a camera capable of designating the number of prints, according to a third embodiment of the invention.
Figure 10:
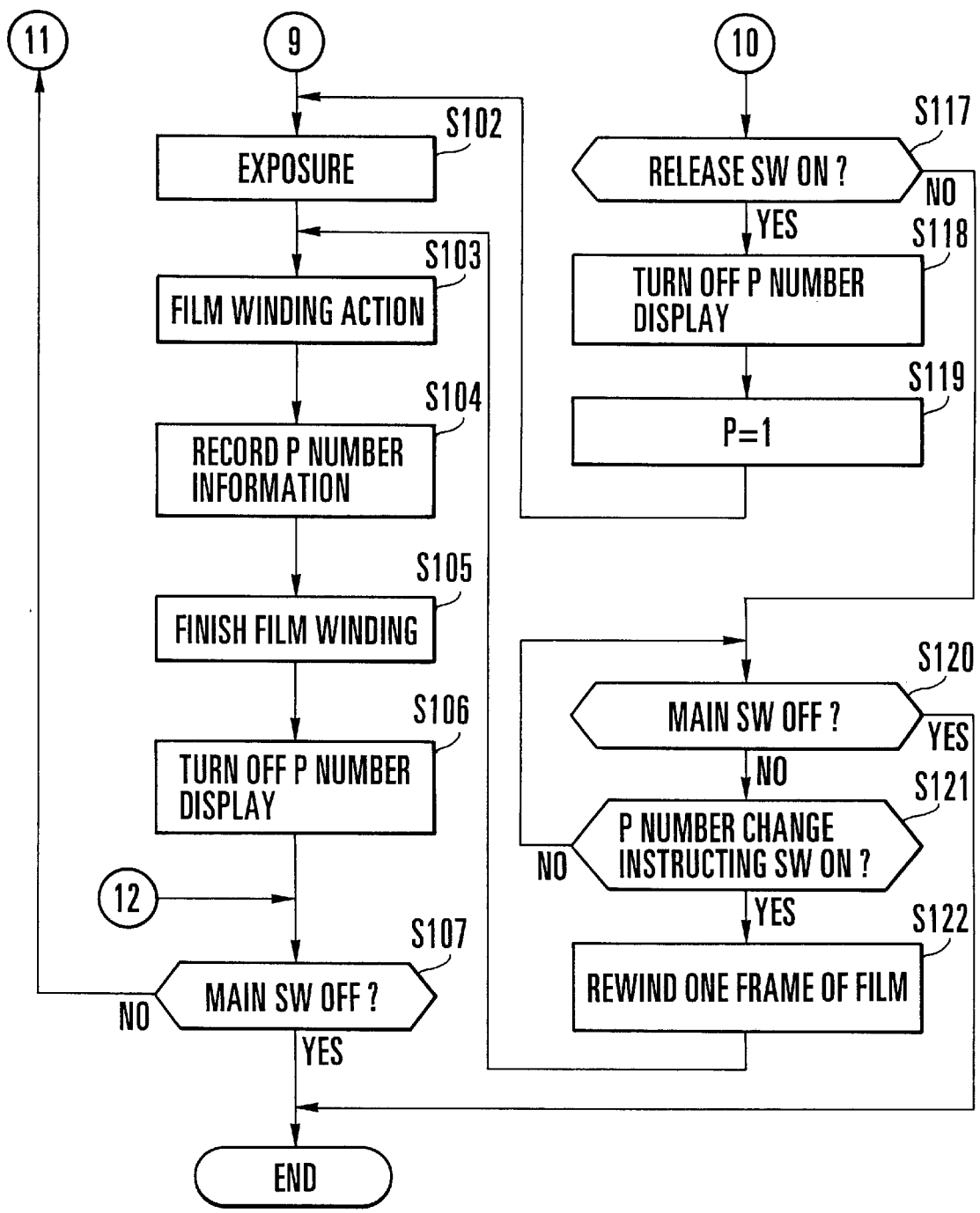
FIG. 10 is a flow chart showing a part continuing from the flow of operation shown in FIG. 9.

FIGS. 9 and 10 are flow charts of a CPU showing the operation of a camera capable of designating the number of prints, according to a third embodiment of the invention. The appearance and the electrical arrangement of the third embodiment are the same as the second embodiment shown in FIGS. 5 and 6. Therefore, the details of the structural and electrical arrangements of the third embodiment are omitted from the following description.

Referring to FIG. 9, when the CPU 210 detects the on-state of the main switch 106 at a step S90, the flow proceeds to a step S91. At the step S91, a check is made to find if the film is a negative film or a positive film. If the film is found to be a negative film, the flow proceeds to a step S92-1 to set "P=1" at the register for counting the number of prints. If the film is found to be a positive film, the flow proceeds to a step S92-2 to set "P=0" at the number-of-prints counting register.

At the next step S93, a check is made for the state of the number-of-prints designating switch 212. If the number-of-prints designating switch 212 is found to be in the off-state, the flow of operation proceeds to a step S108. At the step S108, a check is made to find if the release switch 211 is in the on-state. If so, the flow proceeds to a step S102 of FIG. 10. If not, the flow proceeds to a step S107 of FIG. 10. Meanwhile, if the number-of-prints (P number) designating switch 212 is found at the step S93 to be in the on-state, the flow proceeds from the step S93 to a step S94. At the step S94, the camera is set into a mode of designating the number of prints (P number). At the next step S95, the display circuit 219 is caused to display a figure which corresponds to the number of prints at the external display device 105. In this instance, a display "P1" is lighted up.

At a step S96, a check is made to find if the mode selection switch 213 is in the on-state. If so, the flow proceeds to a step S110 for processes which will be described in detail later. If not, the flow proceeds to a step S97. At the step S97, a check is made to find if the number-of-prints designating switch 212 still remains in the on-state. If so, the flow proceeds to a step S98 to add "1" to the P value of the number-of-prints counting register. At the next step S99, a check is made to find if the P value of the number-of-prints counting register has become larger than "9". The P value is at "2" (P=2) in this instance. The flow then returns to the step S95 to display the figure corresponding to the number-of-prints at the external display device 105. At the external display device 105, "P2" is lighted up in this instance.

With these steps repeated, figures corresponding to the P values of the number-of-prints counting register are displayed one after another at the external display device 105 every time the number-of-prints designating switch 212 is turned on. When the P value of the number-of-prints counting register comes to exceed "9", the flow proceeds to a step S100. At the step S100, the P value of the number-of-prints counting register is brought back to "0", and the flow returns to the step S95.

When the number-of-prints designating switch 212 is found at the step S97 to be turned off, with a number-of-prints setting operation considered to be finished, the flow proceeds to a step S101. At the step S101, a check is made for the state of the release switch 211. If the release switch 211 is found to be in the off-state, the flow returns to the step S95. If the release switch 211 is found to be in the on-state, the flow proceeds to the step S102 of FIG. 10.

At the step S102 of FIG. 10, an exposure action is carried out in a known manner. At the next step S103, the motor driving circuit 216 is caused to drive the motor 215. The motor 215 then begins to perform a one-frame film winding action on an exposed frame of the film. At a step S104, the magnetic recording circuit 218 is caused to drive the magnetic head 217 to record information on the designated number of prints in the magnetic track part of the film while the one frame film winding action is in process. At the next step S105, the motor driving circuit 216 is caused to bring the rotation of the motor 215 to a stop. The one-frame film winding action then comes to an end. At a step S106, the number-of-prints display of the external display device 105 is turned off. At a step S107, a check is made for the state of the main switch 106. If the main switch 106 is found to be still in the on-state, the flow returns to the step S91 to perform the processes of designating the number-of-prints for the next photo-taking frame of the film. If the main switch 106 is found to be in the off-state, the flow of operation comes to an end.

Meanwhile, if the mode selection switch 213 is found at the step S96 to be in the on-state, the flow proceeds from the step S96 to the step S110 as mentioned above. At the step S110, the camera is set into a number-of-prints (P number) changing mode. At the next step S111, the P value of the number-of-prints counting register is reset to "0". At a step S112, the display mode of the external display device 205 is changed from the lighting-up display mode to the blinking display mode. As a result, a figure which corresponds to "P=0" is displayed at the external display device 105 in a blinking manner.

At the next step S113, a check is made to find if the number-of-prints designating switch 212 is turned on. If so, the flow proceeds to a step S114. At the step S114, "1" is added to the P value of the number-of-prints counting register. At a step S115, a check is made to find if the P value of the number-of-prints counting register has exceeded "9". If not, the flow returns to the step S112 to repeat the above-stated processes. With the processes repeated, when the P value of the number-of-prints counting register is found at the step S115 to have exceeded "9", the flow proceeds from the step S115 to a step S116. At the step S116, the P value of the number-of-prints counting register is reset to "0", and the flow of operation returns to the step S112.

When the number-of-prints designating switch 212 is found at the step S113 to be turned off, with the process of changing or redesignating the number of prints considered to have been completed, the flow proceeds to a step S117 of FIG. 10. At the step S117, a check is made to find if the release switch 211 is turned on. If so, the flow proceeds to a step S118. At the step S118, the number-of-prints display of the external display device 105 is turned off. At the next step S119, the P value of the number-of-prints counting register is set to "1", and the above-stated step S102 and steps subsequent thereto are executed.

If the release switch 211 is found at the step S117 to be in the off-state, the flow proceeds from the step S117 to a step S120. At the step S120, a check is made to find if the main switch 106 is in the off-state. If so, the flow of operation comes to an end. If the main switch 106 is found at the step S120 to be in the on-state, the flow proceeds to a step S121. At the step S121, a check is made to find if the number-of-prints change instructing switch 213 is turned on. If so, the flow proceeds to a step S122. At the step S122, the motor driving circuit 216 is caused to drive the motor 215 to perform a one-frame film rewinding action on a phototaking frame of the film. After the step S122, the flow proceeds to the step S103 described in the foregoing. At the step S103, the motor 215 is caused to begin to reversely rotate to perform the one-frame film winding action this time. At the next step S104, information on the designated number of prints is recorded by the magnetic head 217 in the magnetic track part of the film in the same manner as mentioned in the foregoing. At the step S105, the one-frame winding action is finished. At the step S106, the number-of-prints display at the external display device 105 is turned off. The flow then proceeds from the step S106 to the step S107. If the main switch 106 is found at the step 5107 to be still in the on-state, the flow returns to the step S91 to shift the flow of operation to processes of designating the number of prints for the next photo-taking frame. If the main switch 106 is found at the step S107 to be in the off-state, the above-stated flow of operation comes to an end.

In the third embodiment described above, the display of the number of prints designated for an unexposed frame is made in the lighting-up display mode (at the step S95 of FIG. 9). On the other hand, the display of the number of prints designated for an exposed frame is made in the blinking display mode (at the step S112 of FIG. 9). In other words, the display mode for an exposed frame is arranged to differ from the display mode for an unexposed frame. Therefore, as in the case of the second embodiment, the third arrangement also eliminates the shortcoming of the prior art arrangement whereby a display of the redesignated number of prints for an exposed frame can be hardly discriminated from a display of the designated number of prints for an unexposed frame.

In the event of an inadvertent release operation while the number-of-prints designation changing action is in process, the release action is allowed to be carried out. However, since the number of prints is forcibly set to "1", in that event, at the step S119 of FIG. 10, the number of prints can be prevented from being designated to a large number wastefully.

Further, the display for changing the designated number of prints, i.e., a number-of-prints redesignating display, is arranged to be made by showing figures in rotation from "0" (the step S111 of FIG. 9), unlike the prior art arrangement whereby the rotative display begins from "1". According to the prior art arrangement, in a case where it is desired to designate "0" which is often desired because the desire for redesignating or changing the number of prints often results from a photo-taking failure, the designation must be made by repeating the process of correction in such a way as 1→2→3→4→5→6→7→8→9→0. This shortcoming can be eliminated by the arrangement of the third embodiment.

A further advantage of the third embodiment lies in the following point. In the third embodiment, the rotative operation for setting the designated number of prints is arranged to start from the number which has a highest probability rate among other numbers of prints for each of negative and positive films. In other words, in selecting or setting the designated number of prints in rotation, the rotation starts from "1" for a negative film and starts from "0" for a positive film. Since a positive film is not often required to be printed, the arrangement enables the user to promptly designate the number of prints to "0". Therefore, the operability of the camera can be greatly enhanced.

Figure 11:
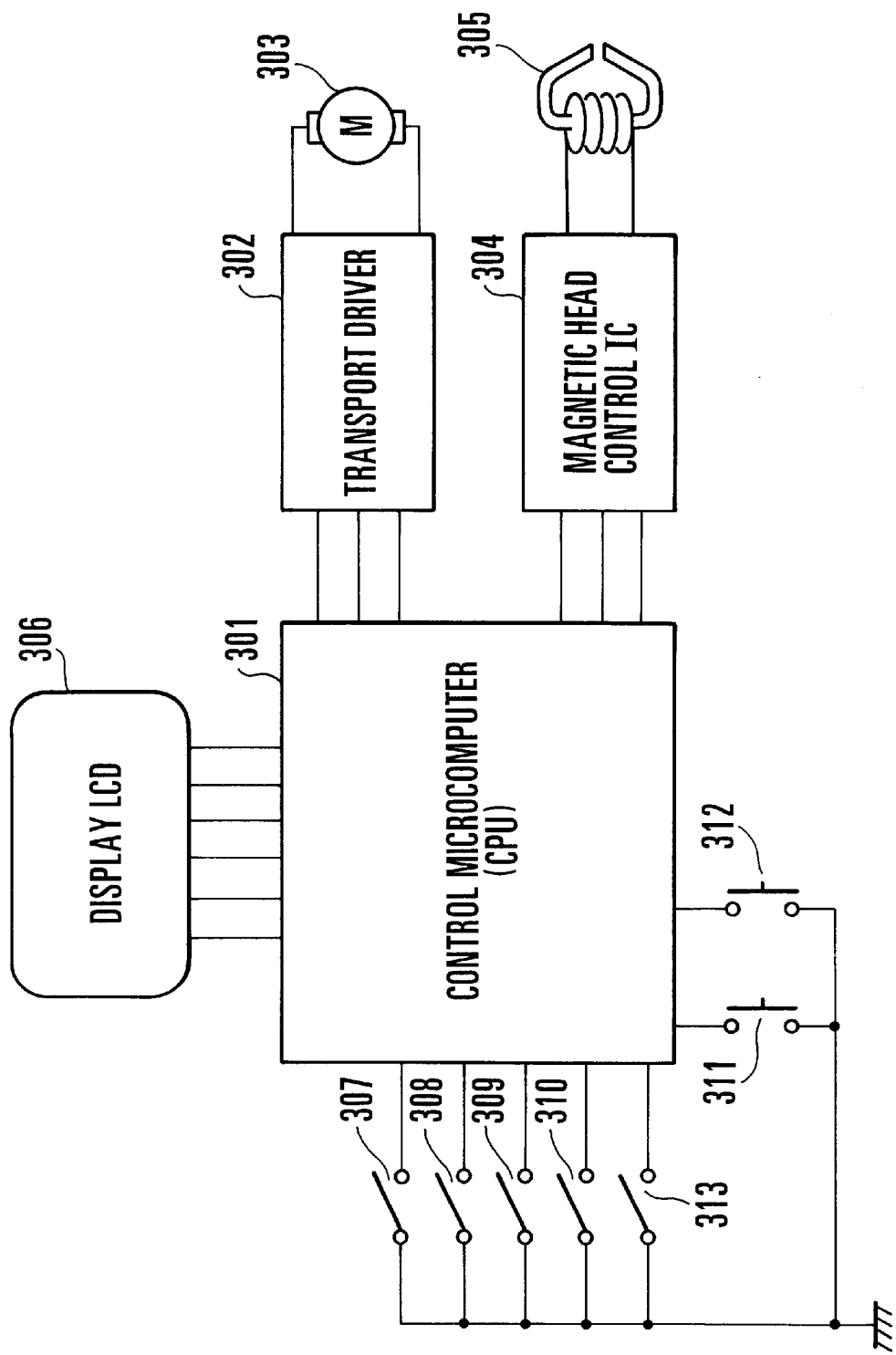
FIG. 11 is a block diagram showing essential parts of a camera capable of designating the number of prints, according to a fourth embodiment of the invention.

FIG. 11 is a block diagram showing the arrangement of essential parts of a camera capable of designating the number of prints, according to a fourth embodiment of the invention.

Referring to FIG. 11, the camera includes a control microcomputer (CPU) 301 which is arranged to control the whole camera including a film transport driver 302, a magnetic head control IC 304, etc. The film transport driver 302 is arranged to drive a film transport motor 303 to perform film winding and rewinding actions. A magnetic head 305 is arranged to write information in a magnetic recording part of a film under the control of the magnetic head control IC 304. A number-of-prints designating switch 307 is arranged to bring the camera into a number-of-prints designating mode when it turns on. A frame designating switch 308 is arranged to selectively designate either a frame before exposure (before-exposure frame) or a frame after exposure (after-exposure frame) as the frame for which information on the designated number of prints is to be written. The camera is also provided with number-of-prints setting switches 309 and 310. The number-of-prints setting switch 309 is an upward setting switch which is provided for incrementing the number of prints to be designated. The other number-of-prints setting switch 310 is a downward setting switch which is provided for decrementing the number of prints to be designated. A photo-taking start switch 311 (may sometimes be referred to as SW1) is provided for starting a photo-taking operation. A preceding-frame returning switch 312 is provided for returning the film from its current frame position to a preceding frame position in changing the number of prints designated for the preceding frame after the frame is exposed for photo-taking. The designated number of prints magnetically written at the preceding frame can be changed to a newly designated number by turning on the preceding-frame returning switch 312. A frame changing switch 313 is provided for changing a frame designated by the frame designating switch 308.

Figure 12:
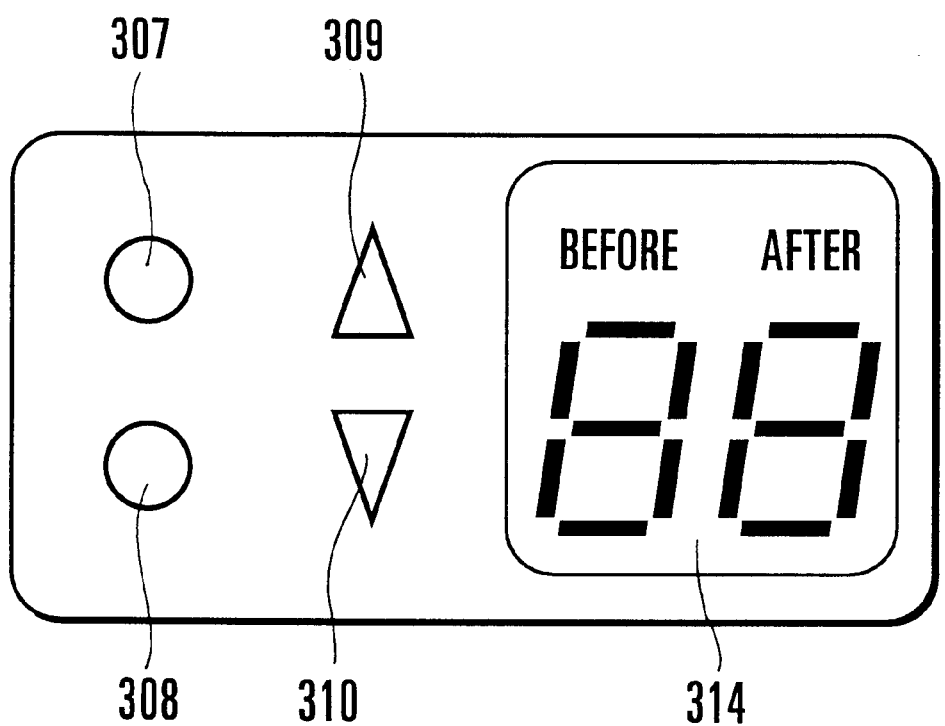
FIG. 12 shows a layout of switches of the camera capable of designating the number of prints, according to the fourth embodiment of the invention.

FIG. 12 shows the layout of the above switches 307 to 310 and the arrangement of a display part 314 on the camera. The display part 314 is arranged to display the number of prints set by the upward setting switch 309 or the downward setting switch 310, and a frame number assigned to the frame designated by the frame designating switch 308.

An operation for designating the number of prints of the camera capable of designating the number of prints arranged as described above is next described below with reference to FIG. 13, which is a flow chart showing a flow of processes to be executed by the CPU 301.

Figure 13:
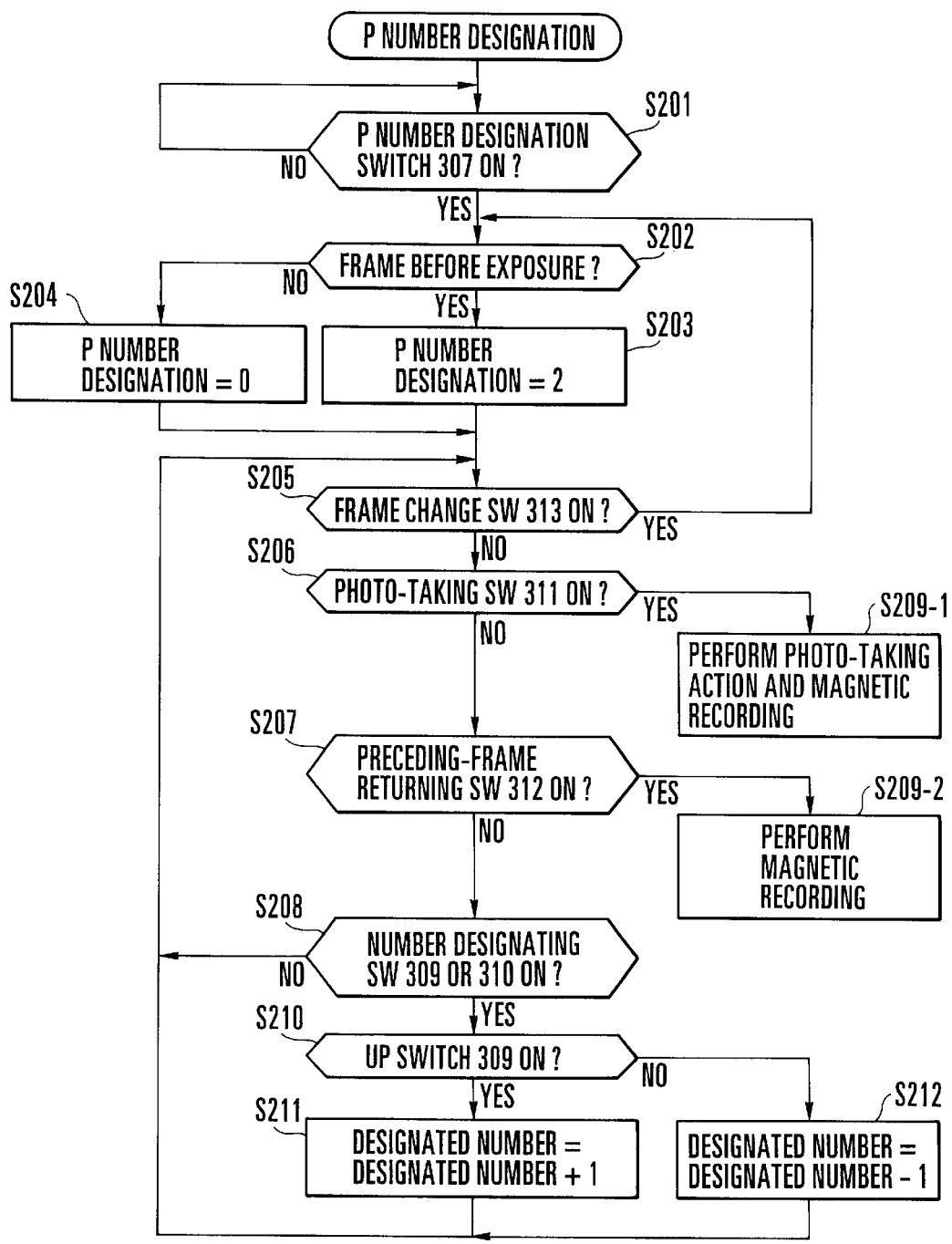
FIG. 13 is a flow chart showing an operation related to designation of the number of prints in the camera capable of designating the number of prints, according to the fourth embodiment of the invention.

At a step S201 of FIG. 13, a check is made to find if the number-of-prints designating switch 307 is turned on. If so, the flow of operation proceeds to a step S202. At the step S202, a check is made for the state of the frame designating switch 308 to decide whether the number-of-prints designation is to be made for a frame before exposure (before-exposure frame) or for a frame after exposure (after-exposure frame).

The number-of-prints designating switch 307 is expected to be operated by the user in the following two cases:

(1) When a photo-taking operation on a frame is felt to be a failure immediately after the exposure (for example, when an object to be photographed has moved); and (2) When two prints are, for example, desired before taking a shot of two friends together.

In the case (2) above, the flow of operation proceeds from the step S202 to a step S203. At the step S203, since it is intended to take a picture of two friends together, the number of prints "2" is designated as the number of prints initially set for a photo-taking frame before exposure. Therefore, in this case, it is not necessary to set the designated number of prints by operating the upward setting switch 309 or the downward setting switch 310. Then, if the intended picture is for three people, instead of two, the designated number of prints can be set by turning on the upward setting switch 309 only once. Therefore, compared with the prior art arrangement, the camera has an improved operability.

At the next step S205, a check is made for the state of the frame changing switch 313. If the frame changing switch 313 is found to be in the on-state, the flow of operation returns to the step S202 to reset the initial number of prints. The provision of this step enables the user to correct any error made in selecting a number-of-prints designating frame from between the before-exposure frame and the after-exposure frame.

Further, in the event of the case (1), which applies mostly to a failure in taking a shot, the flow proceeds from the step S202 to a step S204. At the step S204, the number of prints "0" is designated as an initial setting number of prints for an after-exposure frame. This step also obviates the necessity of operating the upward or downward setting switch 309 or 310. The flow then proceeds to the step S205 to find if the frame changing switch 313 is in the on-state. If so, the flow returns to the step S202.

If the frame changing switch 313 is found at the step S205 to be not in the on-state, the flow proceeds to a step S206. At the step S206, a check is made to find if the photo-taking start switch 311 is in the on-state. If so, the flow proceeds to a step S209-1. At the step S209-1, the number-of-prints designating action is brought to an end and a photo-taking operation is carried out in a known manner, and after that, the magnetic head 305 is caused to write information on the above-stated number of prints on the film when the one-frame film winding action is performed on the film by the motor 303.

If the photo-taking start switch 311 is found at the step S206 to be not in the on-state, the flow proceeds from the step S206 to a step S207. At the step S207, a check is made to find if the preceding-frame returning switch 312 is turned on. If so, the flow proceeds to a step S209-2. At the step S209-2, the number-of-prints designating action is brought to an end. The motor 303 is caused to rewind the film to an extent corresponding to one frame. After the one-frame film rewinding action, the magnetic head 305 is caused to write information on the number of prints on the film while the film is in process of being wound no the extent of one frame by the motor 303.

Further, if the preceding-frame returning switch 312 is found at the step S207 to be not in the on-state, the flow proceeds to a step S208. At the step S208, a check is made to find if the upward or downward setting (number- of-prints setting) switch 309 or 310 is turned on. If not, the flow returns to the step S205 to repeat the above-stated steps. If so, the flow proceeds to a step S210. At the step S210, a check is made to find if the upward setting switch 309 is turned on. If so, the flow proceeds to a step S211. At the step S211, the designated number of prints is incremented by one (+1) and then the flow returns to the step S205 to repeat the above-stated steps. Further, in this instance, if the frame changing switch 313 is found to be turned on, the flow returns from the step S205 to the step S202, so that the number-of-prints designating frame can be changed either to a before-exposure frame or to an after-exposure frame. If the downward setting switch 310, instead of the upward setting switch 309, is found at the step S210 to be turned on, the flow proceeds to a step S212 to decrement the designated number of prints by one (−1) The flow then returns from the step S212 to the step S205 to repeat the above-stated steps.

The fourth embodiment is thus arranged to change the initial designated number of prints according to whether the number of prints is to be designated for a before-exposure frame or for an after-exposure frame. This arrangement greatly enhances the operability of the camera, as the number of times of repeating a troublesome operation of changing the designated number of prints can be effectively reduced by the arrangement.

Figure 14:
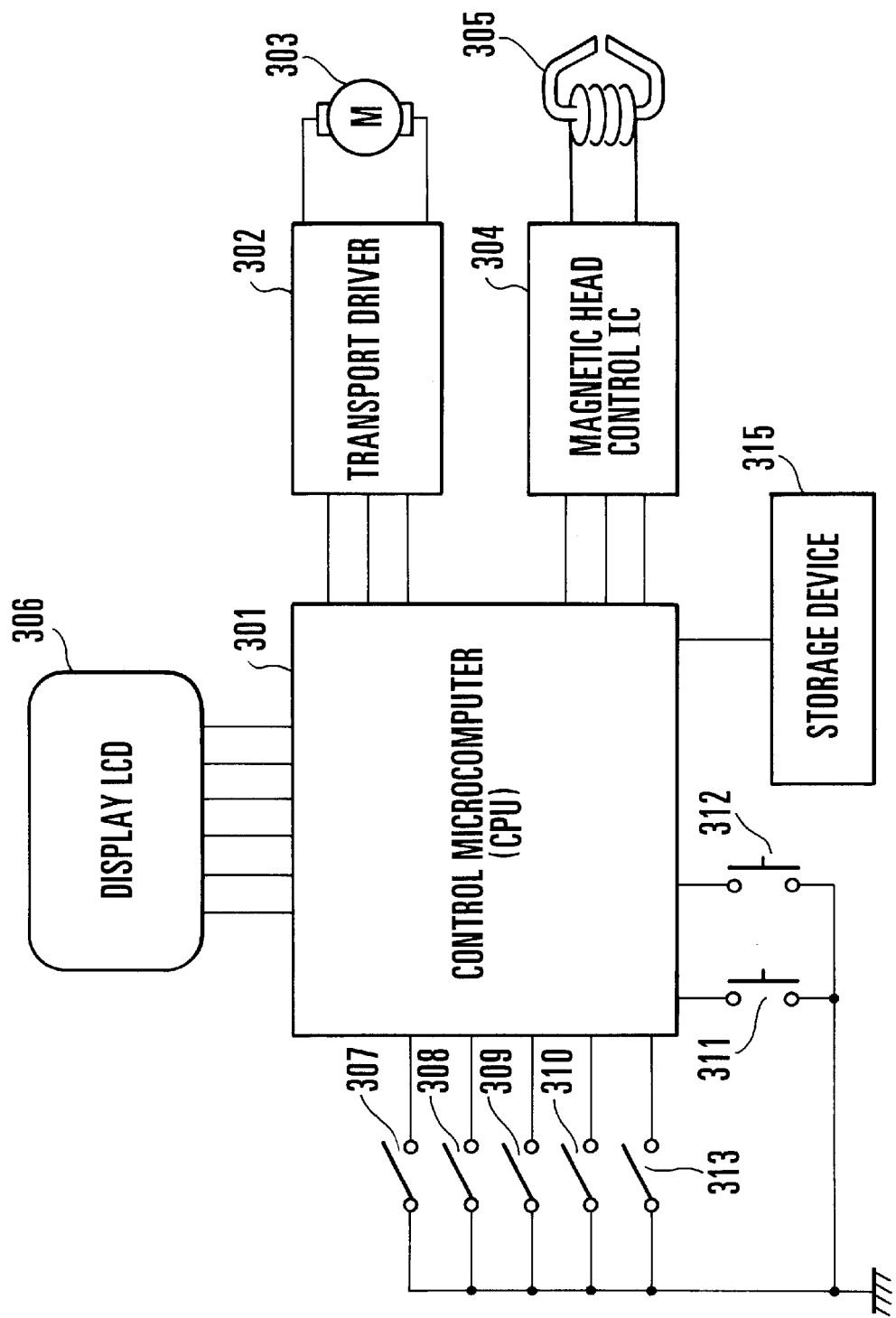
FIG. 14 is a block diagram showing essential parts of a camera capable of designating the number of prints, according to a fifth embodiment of the invention.

FIG. 14 is a block diagram showing the arrangement of essential parts of a camera capable of designating the number of prints, according to a fifth embodiment of the invention. The camera is arranged in the same manner as the arrangement of the fourth embodiment shown in FIG. 11 except that a storage device 315 is added to what is shown in FIG. 11. Therefore, the details of the same parts are omitted from the following description.

Figure 15:
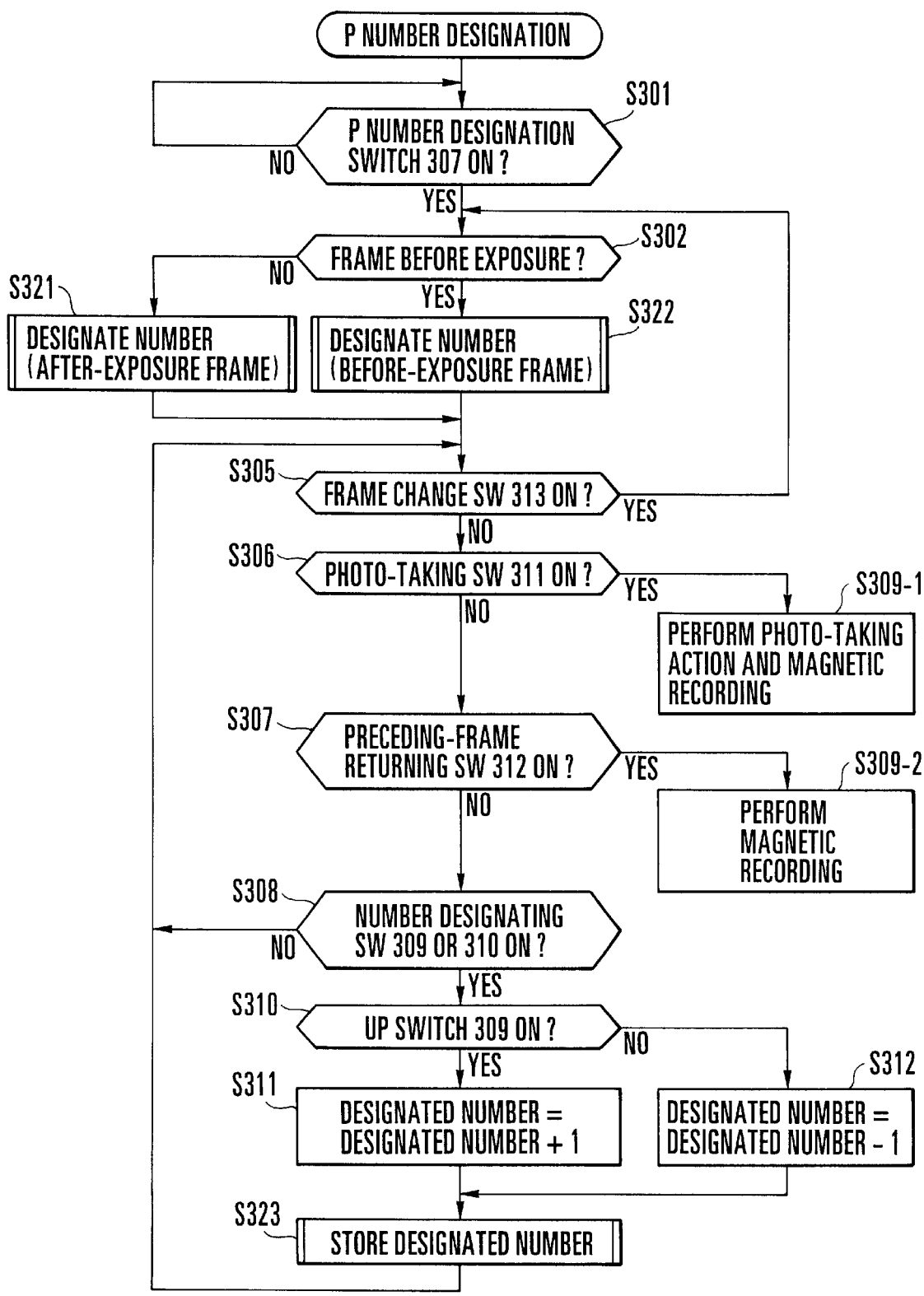
FIG. 15 is a flow chart showing an operation related to designation of the number of prints in the camera capable of designating the number of prints, according to the fifth embodiment of the invention.

FIG. 15 is a flow chart showing a number-of-prints designating operation of the CPU 301 in the fifth embodiment of the invention. In FIG. 15, steps arranged for the same processes as those of the fourth embodiment are indicated by step numbers which have the same figures in lower two places as the corresponding steps shown in FIG. 13.

Referring to FIG. 15, at a step S301, a check is made to find if the number-of-prints designating switch 307 is turned on. If so, the flow of operation proceeds to a step S302. At the step S302, a check is made for the state of the frame designating switch 308 to decide whether the number-of-prints designation is to be made for a frame before exposure (before-exposure frame) or for a frame after exposure (after-exposure frame). In the case (2) mentioned in the foregoing, i.e., in the case of a before-exposure frame, the flow of operation proceeds from the step S302 to a step S322. The details of the step S322 are described with reference to the flow chart of FIG. 16.

Figure 16:
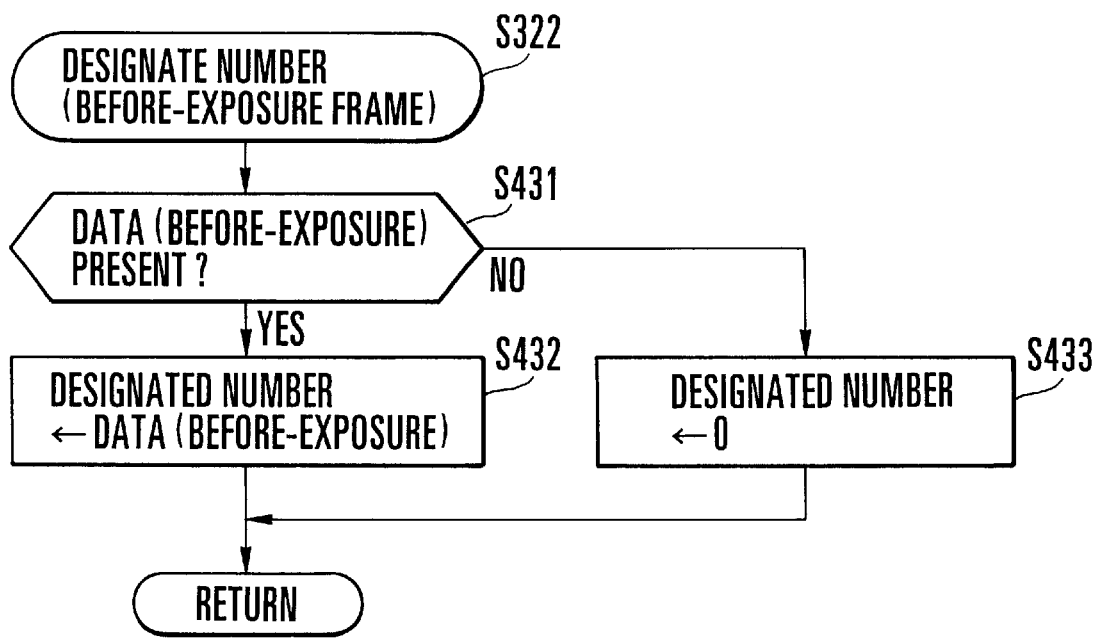
FIG. 16 is a flow chart showing the processes to be executed at a step S322 of the flow chart of FIG. 15.

Referring to FIG. 16, at a step S431, a check is made for the presence of data stored in the storage device 315. If data (for the before-exposure frame) is found in the storage device 315, the flow proceeds to a step S432. At the step S432, a value stored in the storage device 315 (the initial designated number of prints) is set as the designated number of prints. If no data is found in the storage device 315, the flow proceeds to a step S433. At the step S433, "0" is designated, and the flow proceeds to a step S305 of FIG. 15.

If the number-of-prints designating frame is a frame after exposure (after-exposed frame) as in the case (1) mentioned in the foregoing, the flow proceeds from the step S302 to a step S321. The details of the S321 are described with reference to the flow chart of FIG. 17.

Figure 17:
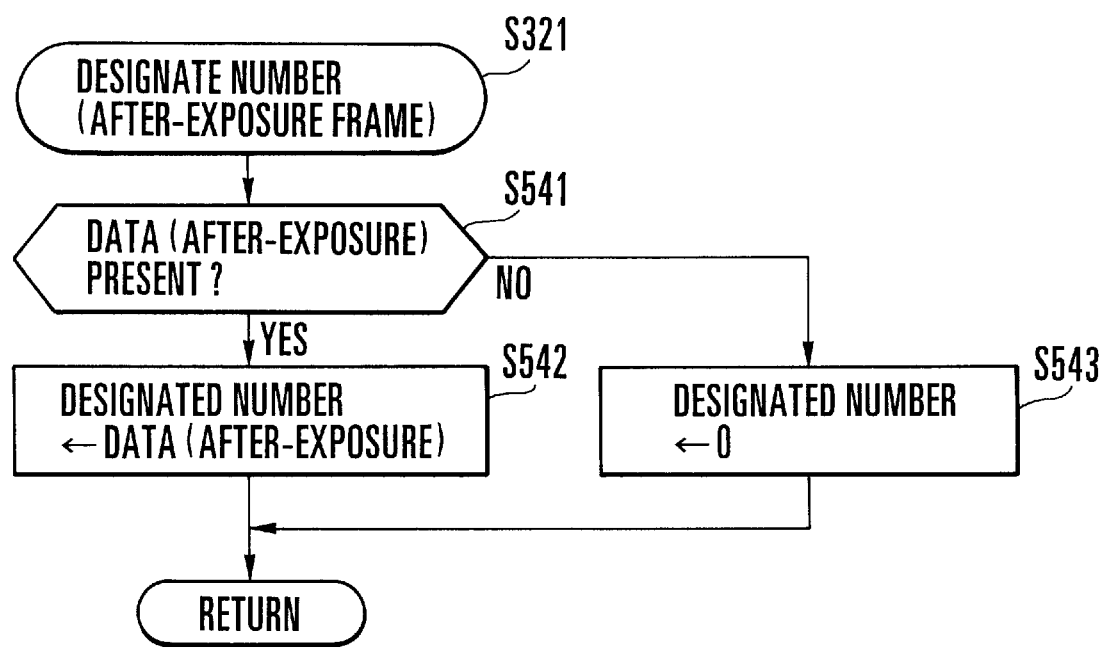
FIG. 17 is a flow chart showing the processes to be executed at a step S321 of the flow chart of FIG. 15.

With the flow having proceeded to the step S321, at a step S542 of FIG. 17, a check is made to find if any data (for the after-exposure frame) is stored in the storage device 315. If so, the flow proceeds to a step S542. At the step S542, a value stored in the storage device 315 (the initial designated number of prints) is set as the designated number of prints. If not, the flow proceeds to a step S543. At the step S543, "0" is designated, and the flow proceeds to the step S305 of FIG. 15.

At the step S305, a check is made to find if the frame changing switch 313 is in the on-state. If so, the flow returns to the step S302. If not, the flow proceeds to a step S306. At the step S306, a check is made to find if the photo-taking start switch 311 is in the on-state. If so, the flow proceeds to a step S309-1. At the step S309-1, the number-of-prints designating action is brought to an end and a photo-taking operation is carried out in a known manner. After that, the magnetic head 305 is caused to write information on the above-stated number of prints on the film when the one-frame film winding action is performed by the motor 303 on the film.

If the photo-taking start switch 311 is found at the step S306 to be not in the on-state, the flow proceeds from the step S306 to a step S307. At the step S307, a check is made to find if the preceding-frame returning switch 312 is turned on. If so, the flow proceeds to a step S309-2. At the step S309-2, the number-of-prints designating action is brought to an end. The motor 303 is caused to rewind the film to an extent corresponding to one frame. After the one-frame film rewinding action, the magnetic head 305 is caused to write information on the number of prints on the film while the motor 303 is in process of winding the film to the extent of one frame.

If the preceding-frame returning switch 312 is found at the step S307 to be not in the on-state, the flow proceeds to a step S308. At the step S308, a check is made to find if the upward or downward setting (number-of-prints setting) switch 309 or 310 is turned on. If neither of them is found to have been turned on, the flow returns to the step S305 to repeat the above-stated steps. If either of them is found to have been turned on, the flow proceeds from the step S308 to a step S310. At the step S310, a check is made to find if the upward setting switch 309 is turned on. If so, the flow proceeds to a step S311. If not, the flow proceeds to a step S312. At the step S311, the designated number of prints is incremented by one (+1). At the step S312, the designated number of prints is decremented by one (−1). After each of the steps S311 and S312, the flow proceeds to a step S323. The details of the step S323 are described below with reference to the flow chart of FIG. 18.

Figure 18:
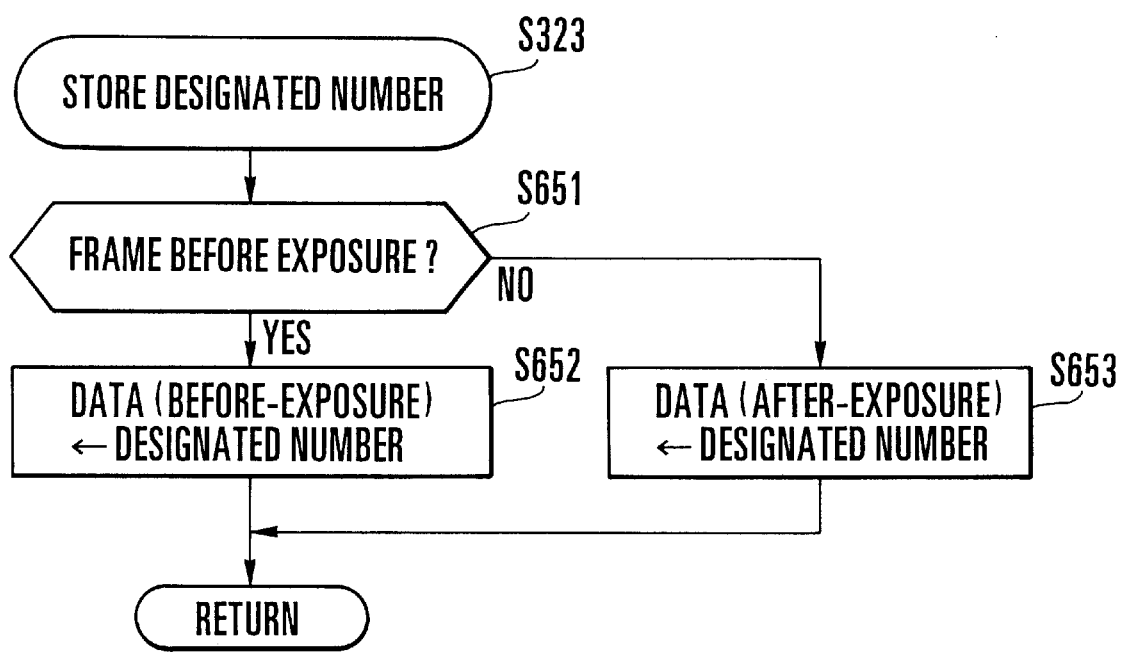
FIG. 18 is a flow chart showing the processes to be executed at a step S323 of the flow chart of FIG. 15.

At a step S651 of FIG. 18, a check is made to find whether the frame for which the designated number of prints is to be stored is a frame before exposure (before-exposure frame) or a frame after exposure (after-exposure frame). If the frame is found to be the before-exposure frame, the flow of operation proceeds to a step S652. At the step S652, the revised (updated) number of prints is stored as the designated number at a before-exposure data storage part within the storage device 315. On the other hand, in the event of the after-exposure frame, the flow proceeds from the step S651 to a step S653 to store the revised number of prints at an after-exposure data storage part within the storage device 315. The flow then returns from the step S323 to the step S305 of FIG. 15 to repeat the above-stated steps.

As described above, in addition to the advantage of the fourth embodiment, the fifth embodiment is arranged to designate, as the number of prints, a value stored in the storage device 315. In other words, the fifth embodiment is arranged to have a learning function, which makes number-of-prints changing operations by the user easier, so that the operability of the camera can be further enhanced by the arrangement.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in each of the embodiments described above, a display of the number of prints designated for an unexposed frame is made in a lighting-up mode, while a display of the number of prints designated for an exposed frame is made in a blinking mode. The embodiment is thus arranged to facilitate a discrimination between the designation for an unexposed frame and the designation for an exposed frame by varying the display mode. However, the different display modes may be conversely arranged. The discrimination by varying the display mode also may be changed to any other suitable method, such as use of a sound, so long as the designation for an exposed frame can be discriminated from the designation for an unexposed frame.

In the case of each of the embodiments described above, the frame for which the number of prints can be designated is either an unexposed frame to be next used for photo-taking or an exposed frame preceding the unexposed frame. However, the arrangement of the invention is applicable to any of the exposed and unexposed frames.

According to the invention, the initially set number of prints and the changed number of prints can be set at any value as desired.

The invention is applicable not only to films but also to image recording media other than films.

The invention is applicable not only to the magnetic method of recording or reading information on or from a film but also to electronic and optical methods of recording and reading information.

The software arrangement and the hardware arrangement included in each of the embodiments described above are interchangeable as desired.

The invention may be carried out by combining as necessary the embodiments or their technological elements described in the foregoing.

The invention applies to cases where either the whole or a part of claims or the arrangement of each embodiment disclosed forms one apparatus or is used in combination with some other apparatus or as a component element of an apparatus.

Further, the invention is applicable to cameras of varied kinds, such as a single-lens reflex camera, a lens-shutter type camera, a video camera, etc., optical apparatuses other than cameras, devices adapted for cameras, optical apparatuses and other apparatuses, and components forming these apparatuses and devices.

What is claimed is:

1. A camera comprising:
   (A) a number-of-prints designating device which designates number of prints for each frame of an image recording medium, said number-of-prints designating device being able to designate a number of prints for an already exposed frame and being able to designate a number of prints for a frame to be exposed; and
   (B) a display device which displays whether a frame for which a number of prints is designated by said number-of-prints designating device is already exposed or to be exposed.

2. A camera according to claim 1, wherein the image recording medium includes a film.

3. A camera according to claim 1, wherein said number-of-prints designating device includes a recording device which records information on the number of prints on the image recording medium.

4. A camera according to claim 1, wherein said number-of-prints designating device includes a recording device which magnetically records information on the number of prints on the image recording medium.

5. A camera according to claim 1, wherein said display device changes a mode of displaying number of prints according to whether the frame for which number of prints is designated is already exposed or to be exposed.

6. A camera comprising:
   (A) a number-of-prints designating device which designates number of prints for a frame of an image recording medium, said number-of-prints designating device designating a number of prints by changing the number of prints from an initial number;
   (B) a memory device which memorizes the number of prints previously designated for another frame by said number-of-prints designating device; and
   (C) a device which changes said initial number on the basis of the number of prints memorized in said memory device.

7. A camera according to claim 6, wherein the image recording medium includes a film.

8. A camera according to claim 6, wherein said number-of-prints designating device includes a recording device which records information on the number of prints on the image recording medium.

9. A camera according to claim 6, wherein said number-of-prints designating device includes a recording device which magnetically records information on the number of prints on the image recording medium.

10. A camera according to claim 6, wherein, if there is no information on the number of prints that has been changed for another frame by said changing device, said number-of-prints designating device sets specific number of prints as the initial value.

11. An apparatus comprising:
    (A) a number-of-prints designating device which designates number of prints for each frame of an image recording medium, said number-of-prints designating device being able to designate a number of prints for an already exposed frame and being able to designate a number of prints for a frame to be exposed; and
    (B) a display device which displays whether a frame for which a number prints is designated by said number-of-prints designating device is already exposed or to be exposed.

12. An apparatus according to claim 11, wherein the image recording medium includes a film.

13. An apparatus according to claim 11, wherein said number-of-prints designating device includes a recording device which records information on the number of prints on the image recording medium.

14. An apparatus according to claim 11, wherein said number-of-prints designating device includes a recording device which magnetically records information on the number of prints on the image recording medium.

15. An apparatus according to claim 11, wherein said display device changes a mode of displaying number of prints according to whether a frame for which a number of prints is designated is already exposed or to be exposed.

16. An apparatus comprising:
    (A) a number-of-prints designating device which designates number of prints for a frame of an image recording medium, said number-of-prints designating device designating a number of prints by changing the number of prints from an initial number of the number of prints;
    (B) a memory device which memorizes the number of prints previously designated for another frame by said number-of-prints designating device; and
    (C) a device which changes said initial number on the basis of the number prints memorized in said memory device.

17. An apparatus according to claim 16, wherein the image recording medium includes a film.

18. An apparatus according to claim 16, wherein said number-of-prints designating device includes a recording device which records information on the number of prints on the image recording medium.

19. An apparatus according to claim 16, wherein said number-of-prints designating device includes a recording device which magnetically records information on the number of prints on the image recording medium.

20. An apparatus according to claim 16, wherein, if there is no information on the number of prints that has been changed for another frame by said changing device, said number-of-prints designating device sets specific number of prints as the initial value.

21. A camera comprising:
    (A) a number-of-prints designating device which designates number of prints for each frame of an image recording medium, said number-of-prints designating device being able to designate a number of prints for an already exposed frame or a frame to be exposed; and
    (B) a control device which sets an initial number of prints to a first number when a frame for which a number of prints is designated by said number of prints designating device is already exposed, and set the initial number of prints to a second number different from the first number when the frame is to be exposed.

22. A camera according to claim 21, wherein said control device includes a memory device which memorizes a previously designated number of prints, with said initial number of prints being set from the number of prints memorized in said memory device.

23. A camera according to claim 21, wherein said number-of-prints designating device designates a number of prints by changing a number of prints cyclically from the initial number of prints.

24. An apparatus comprising:
    (A) a number-of-prints designating device which designates number of prints for each frame of an image recording medium, said number-of-prints designating device being able to designate a number of prints for an already exposed frame or a frame to be exposed; and (B) a control device which sets an initial number of prints to a first number when a frame for which a number of prints is designated by said number of prints designating device is already exposed, and set the initial number of prints to a second number different from the first number when the frame is to be exposed.

25. An apparatus according to claim 24, wherein said control device includes a memory device which memorizes a previously designated number of prints, with said initial number of prints being set from the number of prints memorized in said memory device.

26. An apparatus according to claim 24, wherein said number-of-prints designating device designates a number of prints by changing a number of prints cyclically from the initial number of prints.

\* \* \* \* \*

UNITED STATES PATENT AND TRADEMARK OFFICE
CERTIFICATE OF CORRECTION

PATENT NO.   : 6,351,614 B1
DATED        : February 26, 2002
INVENTOR(S)  : Yukio Ogawa et al.

It is certified that error appears in the above-identified patent and that said Letters Patent is hereby corrected as shown below:

Column 11,
Line 37, delete "step 5107" and insert -- step S107 --.

Signed and Sealed this

Twenty-seventh Day of August, 2002

Attest:

Attesting Officer

JAMES E. ROGAN
Director of the United States Patent and Trademark Office